United States Patent [19]
Hurtig, Jr. et al.

[11] Patent Number: 5,755,078
[45] Date of Patent: May 26, 1998

[54] METHOD AND APPARATUS FOR FOLDING AN INFLATABLE CUSHION

[75] Inventors: Terrence William Hurtig, Jr.; Scott Franklin Mason, both of Dayton; Jeffrey Jack Geiger, Kettering, all of Ohio

[73] Assignee: Omega Automation, Inc., Dayton, Ohio

[21] Appl. No.: 760,378

[22] Filed: Dec. 4, 1996

[51] Int. Cl.$^6$ ............................................. B65B 63/04
[52] U.S. Cl. ........................... 53/429; 53/430; 53/438; 53/529; 53/116; 53/118; 53/120; 493/409; 493/451; 493/457; 493/458
[58] Field of Search .................... 53/116, 117, 118, 53/119, 120, 429, 529, 430, 438; 280/728.1, 728.2, 730.1, 731, 732, 743.1; 493/243, 244, 405, 409, 451, 456, 457, 458, 940

[56] References Cited

U.S. PATENT DOCUMENTS

| | | |
|---|---|---|
| 3,839,947 | 10/1974 | Kornas et al. |
| 3,839,948 | 10/1974 | Putti et al. |
| 4,235,453 | 11/1980 | Lawson et al. |
| 4,286,954 | 9/1981 | McArthur et al. ............ 493/244 |
| 4,351,544 | 9/1982 | Ross |
| 4,903,986 | 2/1990 | Cok et al. |
| 5,022,675 | 6/1991 | Zelenak, Jr. et al. |
| 5,140,799 | 8/1992 | Satoh ............................. 53/429 |
| 5,162,035 | 11/1992 | Baker |
| 5,163,893 | 11/1992 | Hara et al. |
| 5,273,309 | 12/1993 | Lau et al. |
| 5,300,011 | 4/1994 | Budde et al. |
| 5,308,112 | 5/1994 | Hill et al. |
| 5,360,387 | 11/1994 | Baker |
| 5,375,393 | 12/1994 | Baker et al. |
| 5,391,137 | 2/1995 | DePoy et al. |
| 5,425,551 | 6/1995 | Hawthorn ................. 280/728.1 X |
| 5,456,651 | 10/1995 | Baker et al. |
| 5,471,817 | 12/1995 | Baker et al. |
| 5,492,367 | 2/1996 | Albright et al. |
| 5,493,846 | 2/1996 | Baker et al. |
| 5,498,030 | 3/1996 | Hill et al. ................. 280/728.1 X |
| 5,513,877 | 5/1996 | MacBrien et al. ............ 280/732 |
| 5,575,748 | 11/1996 | Budde et al. ................ 493/405 X |
| 5,605,346 | 2/1997 | Cheung et al. ............ 280/793.1 X |
| 5,613,348 | 3/1997 | Lunt et al. ..................... 53/429 |
| 5,632,506 | 5/1997 | Shellabarger .............. 280/732 X |

FOREIGN PATENT DOCUMENTS 6191719   7/1994   Japan.

Primary Examiner—Daniel Moon
Attorney, Agent, or Firm—Killworth, Gottman, Hagan & Schaeff, L.L.P.

[57] ABSTRACT

An apparatus is provided for folding an inflatable cushion having an end portion and a main body portion and inserting the folded cushion into a cover. The apparatus comprises folding structure for creating folds in the main body portion to form a folded cushion. The folding structure including first folding apparatus adapted to create a first fold in the main body portion to form a partially folded cushion, and accordion folding apparatus adapted to create a plurality of accordion folds in the partially folded cushion which are generally transverse to the first fold to form the folded cushion. Further included is apparatus for supporting a cover into which the folded cushion is inserted. The folding structure further serves to insert the folded cushion into the cover.

20 Claims, 13 Drawing Sheets

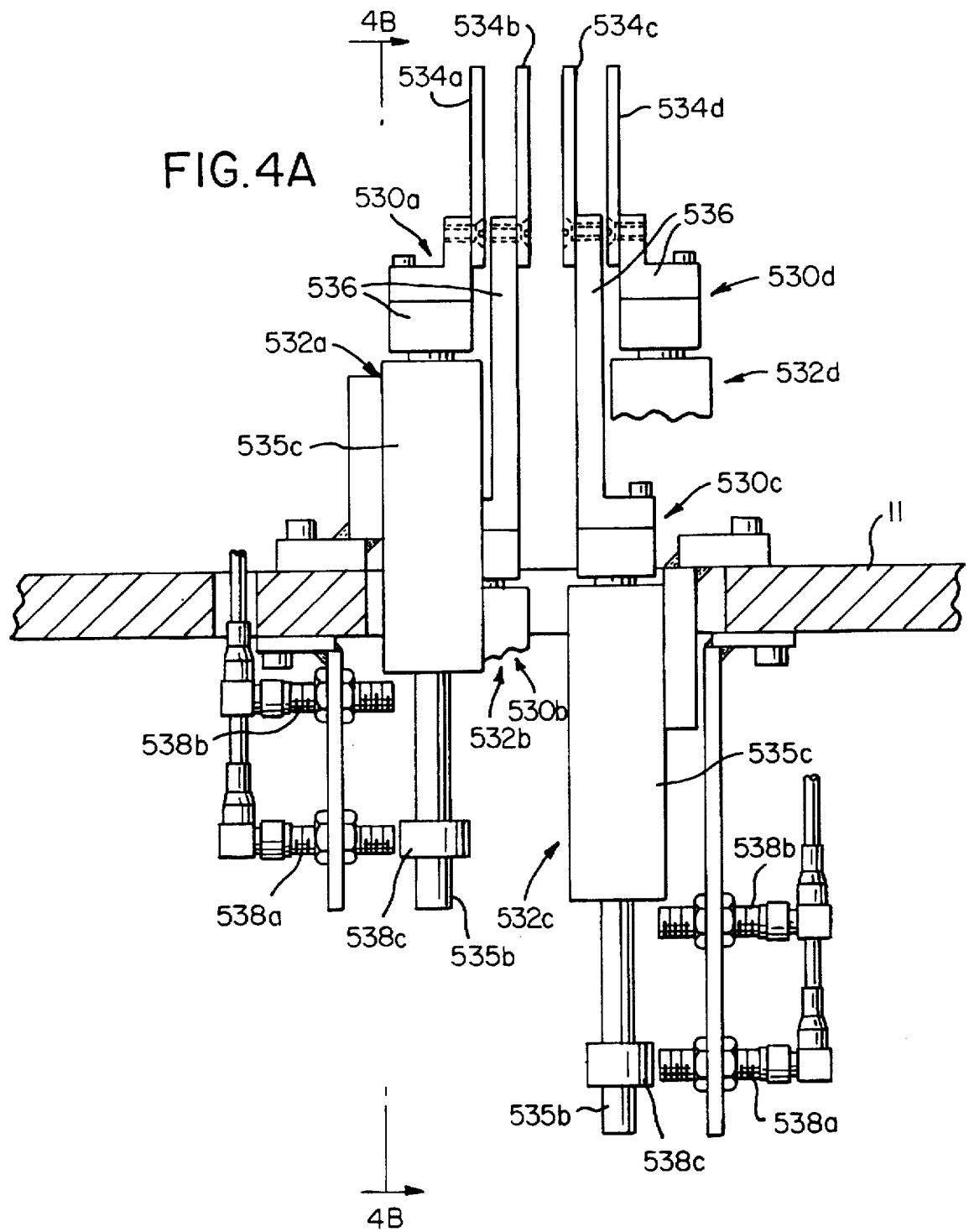

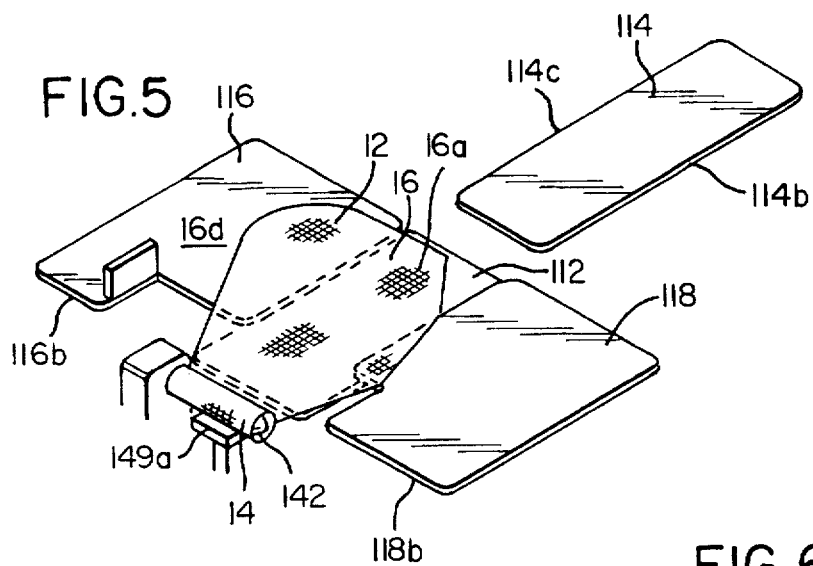
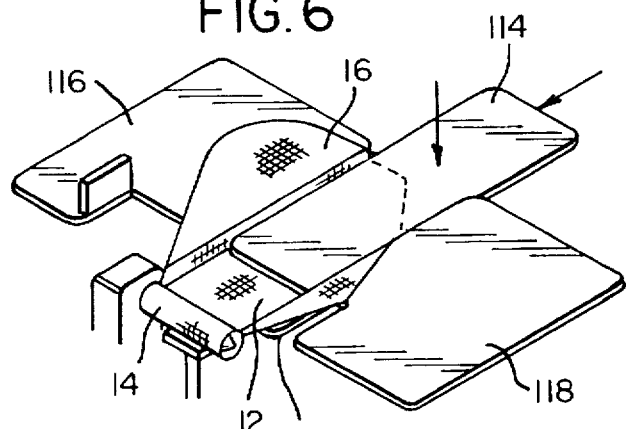
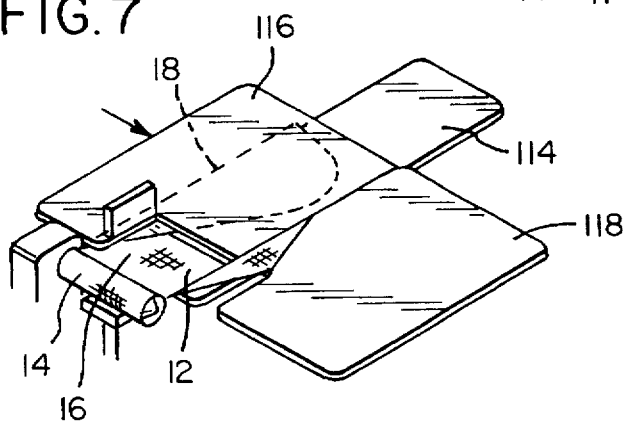
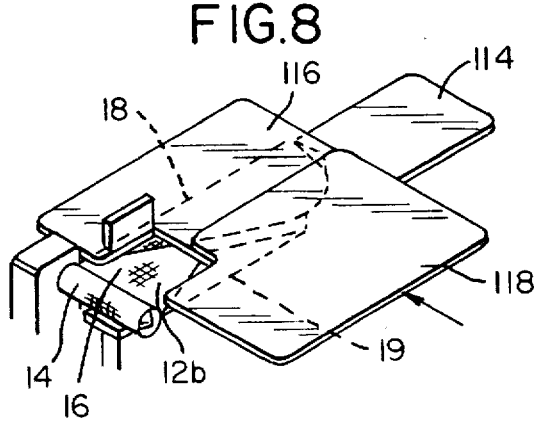

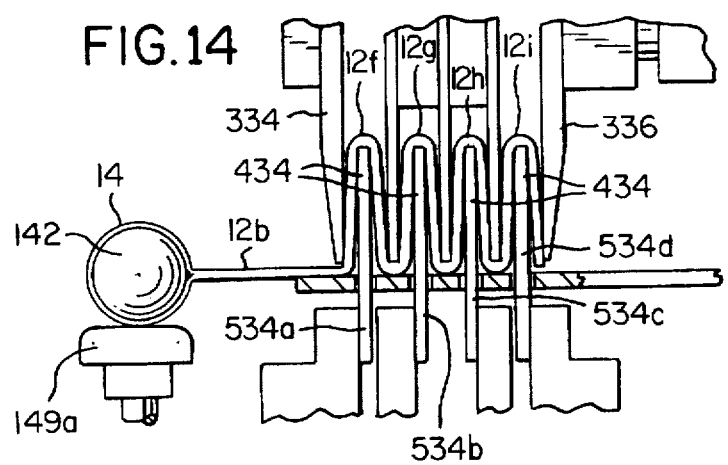
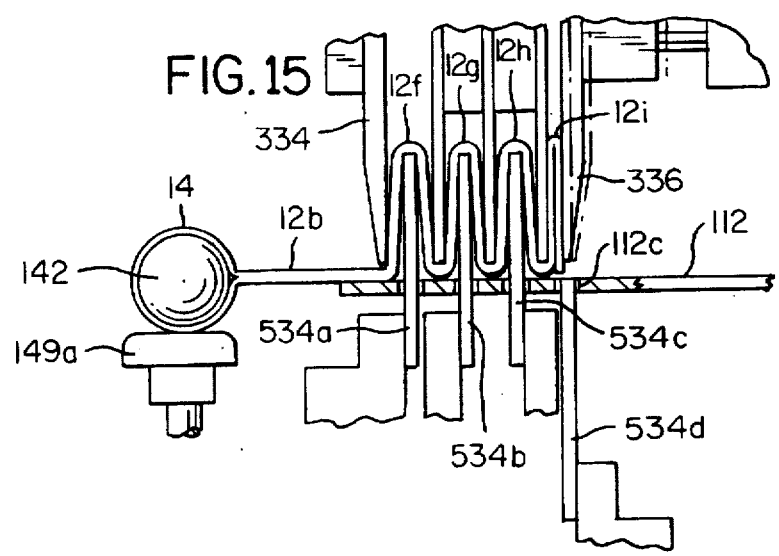
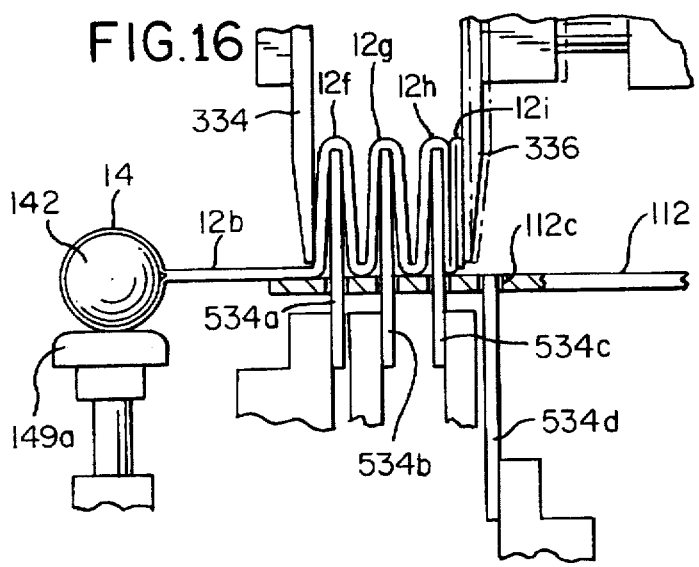

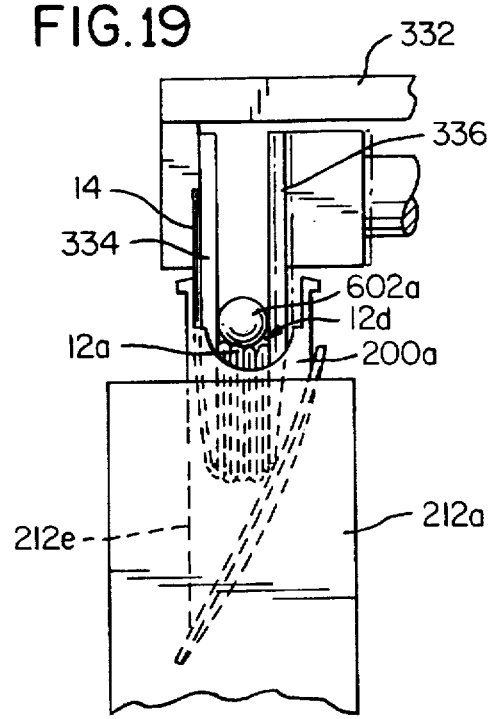
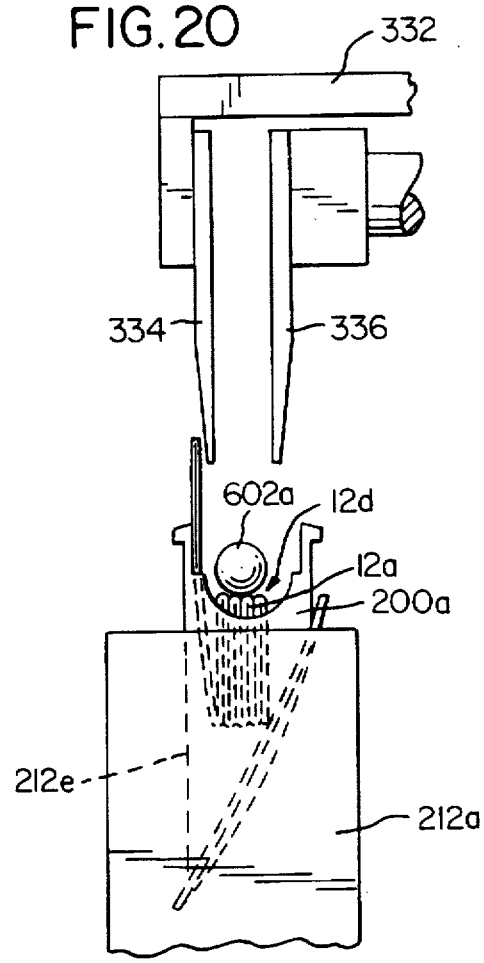
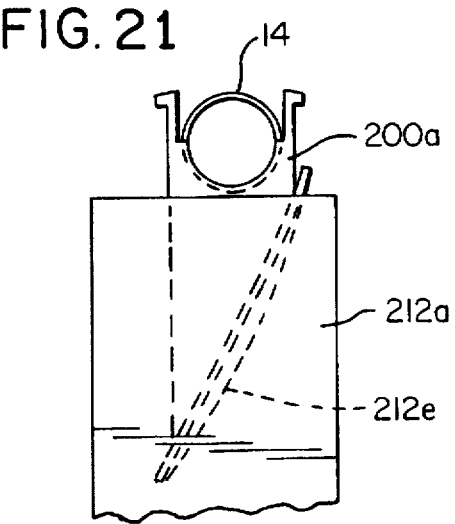

METHOD AND APPARATUS FOR FOLDING AN INFLATABLE CUSHION

BACKGROUND OF THE INVENTION

The present invention relates to an apparatus and method for folding inflatable cushions and, more particularly, to an apparatus and method for folding a side air bag.

The use of air bags for driver and passenger restraint during vehicle impact has grown increasingly popular. Air bags are commonly mounted in steering wheels, steering columns and dashboards of automobiles. Air bags have also been placed near the doors of automobiles to protect passengers from side crashes. Only a limited space is available for air bag storage in vehicles. Accordingly, air bags must be folded to fit within the limited space provided for their storage. However, the air bags must also be capable of unfolding and inflating rapidly without binding.

For side air bags, new methods and apparatus are desired which will reduce costs and improve the consistency of the folds created in such air bags.

SUMMARY OF THE INVENTION

The present invention is directed to a method and apparatus for folding a side cushion or air bag and inserting the folded cushion into a polymeric cover or jacket.

In accordance with a first aspect of the present invention, an apparatus is provided for folding an inflatable cushion having a looped end portion and a main body portion and inserting the folded cushion into a cover. The apparatus comprises folding structure for creating folds in the main body portion to form a folded cushion and apparatus for supporting a cover into which the folded cushion is inserted. The folding structure includes a mandrel adapted to extend through the looped end portion of the cushion. The folding structure further serves to insert the folded cushion into the cover.

The folding structure preferably further comprises: first folding apparatus adapted to create a first fold in the main body portion of the cushion to form a partially folded cushion; and accordion folding apparatus adapted to create at least one accordion fold in the partially folded cushion which is generally transverse to the first fold to form the folded cushion. The first folding apparatus comprises: a base plate which is adapted to receive a central section of the main body portion of the cushion; a movable center plate which is adapted to move from a retracted position to an engagement position where it engages the central section of the cushion such that the central section is clamped between the base plate and the movable center plate; and, a first fold table which is movable from a retracted position to a first fold position so as to create the first fold in the cushion. The first folding apparatus further comprises a second fold table which is movable from a retracted position to a second fold position to create a second fold in the cushion which is generally parallel to the first fold.

Preferably, the first folding apparatus further includes support structure for releasably supporting the first and second fold tables. The first and second fold tables are removable from the support structure to permit each of the first and second fold tables to be repositioned on the support structure on an opposite side of the base plate.

The accordion folding apparatus comprises a main upper carriage, an upper clamping and inserting apparatus, an upper accordion fold device and at least one lower accordion fold device. The main upper carriage is movable back and forth between a folding position and an inserting position. The upper clamping and inserting apparatus includes a base member, a first clamping member fixedly connected to the base member, a second clamping member, a first piston/cylinder unit coupled to the base member and the main upper carriage for effecting movement of the base member relative to the main upper carriage, and a second piston/cylinder unit coupled to the base member and the second clamping member for effecting movement of the second clamping member toward and away from the first clamping member. The upper accordion fold device includes a third piston/cylinder unit and upper accordion blades. The third piston/cylinder unit is coupled to the main carriage and to the upper accordion blades for effecting movement of the upper accordion blades back and forth between a retracted position and an accordion fold position. The one lower accordion fold device includes a reciprocating lower fold blade which is adapted to move relative to the upper accordion blades to create the at least one accordion fold in the partially folded cushion.

The apparatus further includes a mandrel clamping device including a clamping member adapted to clamp the looped end portion to the mandrel.

In accordance with a second aspect of the present invention, an apparatus is provided for folding an inflatable cushion having an end portion and a main body portion and inserting the folded cushion into a cover. The apparatus comprises folding structure for creating folds in the main body portion to form a folded cushion. The folding structure includes first folding apparatus adapted to create a first fold in the main body portion to form a partially folded cushion, and accordion folding apparatus adapted to create a plurality of accordion folds in the partially folded cushion which are generally transverse to the first fold to form the folded cushion. Further included is apparatus for supporting a cover into which the folded cushion is inserted. The folding structure further serves to insert the folded cushion into the cover.

The first folding apparatus comprises: a base plate which is adapted to receive a central section of the main body portion of the cushion; a movable center plate which is adapted to move from a retracted position to an engagement position where it engages the central section of the cushion such that the central section is clamped between the base plate and the movable center plate; and, a first fold table which is movable from a retracted position to a first fold position so as to create the first fold in the cushion. The first folding apparatus further comprises a second fold table which is movable from a retracted position to a second fold position to create a second fold in the cushion which is generally parallel to the first fold.

Preferably, the first folding apparatus further includes support structure for releasably supporting the first and second fold tables. The first and second fold tables are removable from the support structure to permit each of the first and second fold tables to be repositioned on the support structure on an opposite side of the base plate.

The accordion folding apparatus comprises a main upper carriage, an upper clamping and inserting apparatus, an upper accordion fold device, and a plurality of lower accordion fold devices. The main upper carriage is movable back and forth between a folding position and an inserting position. The upper clamping and inserting apparatus includes a base member, a first clamping member fixedly connected to the base member, a second clamping member, a first piston/ cylinder unit coupled to the base member and the main upper carriage for effecting movement of the base member relative to the main upper carriage, and a second piston/cylinder unit coupled to the base member and the second clamping member for effecting movement of the second clamping member toward and away from the first clamping member. The upper accordion fold device includes a third piston/cylinder unit and upper accordion blades. The third piston/cylinder unit is coupled to the main carriage and the upper accordion blades for effecting movement of the upper accordion blades back and forth between a retracted position and an accordion fold position. The plurality of lower accordion fold devices each include a respective reciprocating lower fold blade which is adapted to move relative to the upper accordion blades such that movement of the lower fold blades toward the upper accordion blades creates the plurality of accordion folds in the partially folded cushion.

In accordance with a third aspect of the present invention, a method is provided for folding an inflatable cushion having an end portion and a main body portion and inserting the folded cushion into a cover. The method comprises the steps of: creating a first fold in the main body portion of the cushion to form a partially folded cushion; creating a plurality of accordion folds in the partially folded cushion which are generally transverse to the first fold to form the folded cushion; supporting a cover into which the folded cushion is inserted; and inserting the folded cushion into the cover.

Preferably, the method further comprises the step of creating a second fold in the main body portion of the cushion prior to forming the plurality of accordion folds.

The step of creating a first fold in the main body portion of the cushion to form a partially folded cushion comprises the steps of: clamping a central section of the main body portion between a base plate and a movable center plate; providing a first fold table; and moving the first fold table to a first fold position so as to create the first fold in the cushion.

The step of creating a second fold in the main body portion of the cushion comprises the steps of providing a second fold table, and moving the second fold table to a second fold position so as to create the second fold in the cushion.

The step of creating a plurality of accordion folds comprises the steps of: providing first and second upper clamping members; providing a plurality of upper and lower accordion blades; moving the lower accordion blades toward the upper accordion blades to create the plurality of accordion folds in the folded cushion; moving the second clamping member toward the first clamping member to a first clamping position such that the accordion folds are clamped between the first and second clamping members; and relaxing the second clamping member after it has moved to the first clamping position.

In accordance with a fourth aspect of the present invention, an apparatus is provided for creating first and second folds in an inflatable cushion having an end portion and a main body portion. The apparatus comprises a base plate which is adapted to receive a central section of the main body portion of the cushion; a movable center plate which is adapted to move from a retracted position to an engagement position where it engages the central section of the cushion such that the central section is clamped between the base plate and the movable center plate; a first fold table which is movable from a retracted position to a first fold position so as to create a first fold in the cushion; and a second fold table which is movable from a retracted position to a second fold position to create a second fold in the cushion which is generally parallel to the first fold.

Accordingly, it is an object of the present invention to provide an apparatus for folding an inflatable cushion having a looped end portion and a main body portion and inserting the folded cushion into a cover. It is further an object of the present invention to provide an apparatus for folding an inflatable cushion having an end portion and a main body portion and inserting the folded cushion into a cover. It is another object of the present invention to provide an apparatus for creating first and second folds in an inflatable cushion having an end portion and a main body portion. It is still another object of the present invention to provide a method for folding a side air bag. It is yet a further object of the present invention to provide an apparatus for folding a side air bag. These and other objects and advantages of the present invention will be apparent from the following description, the accompanying drawings and the appended claims.

BRIEF DESCRIPTION OF THE DRAWINGS

FIG. 4A is a front view of the first, second, third and fourth lower accordion fold devices of the apparatus illustrated in FIG. 1;

FIGS. 5–8 illustrate the first folding apparatus effecting a first folding sequence to form a partially folded first inflatable cushion, which cushion is adapted to be placed on a first side of a vehicle;

FIGS. 12–16 illustrate accordion folding apparatus of the apparatus illustrated in FIG. 1 creating accordion folds in an inflatable cushion in accordance with the present invention;

FIGS. 17–21 illustrate upper clamping and inserting apparatus of the accordion folding apparatus clamping, moving and inserting a folded inflatable cushion into a cover or jacket;

DETAILED DESCRIPTION OF THE PREFERRED EMBODIMENT

Figure 1:
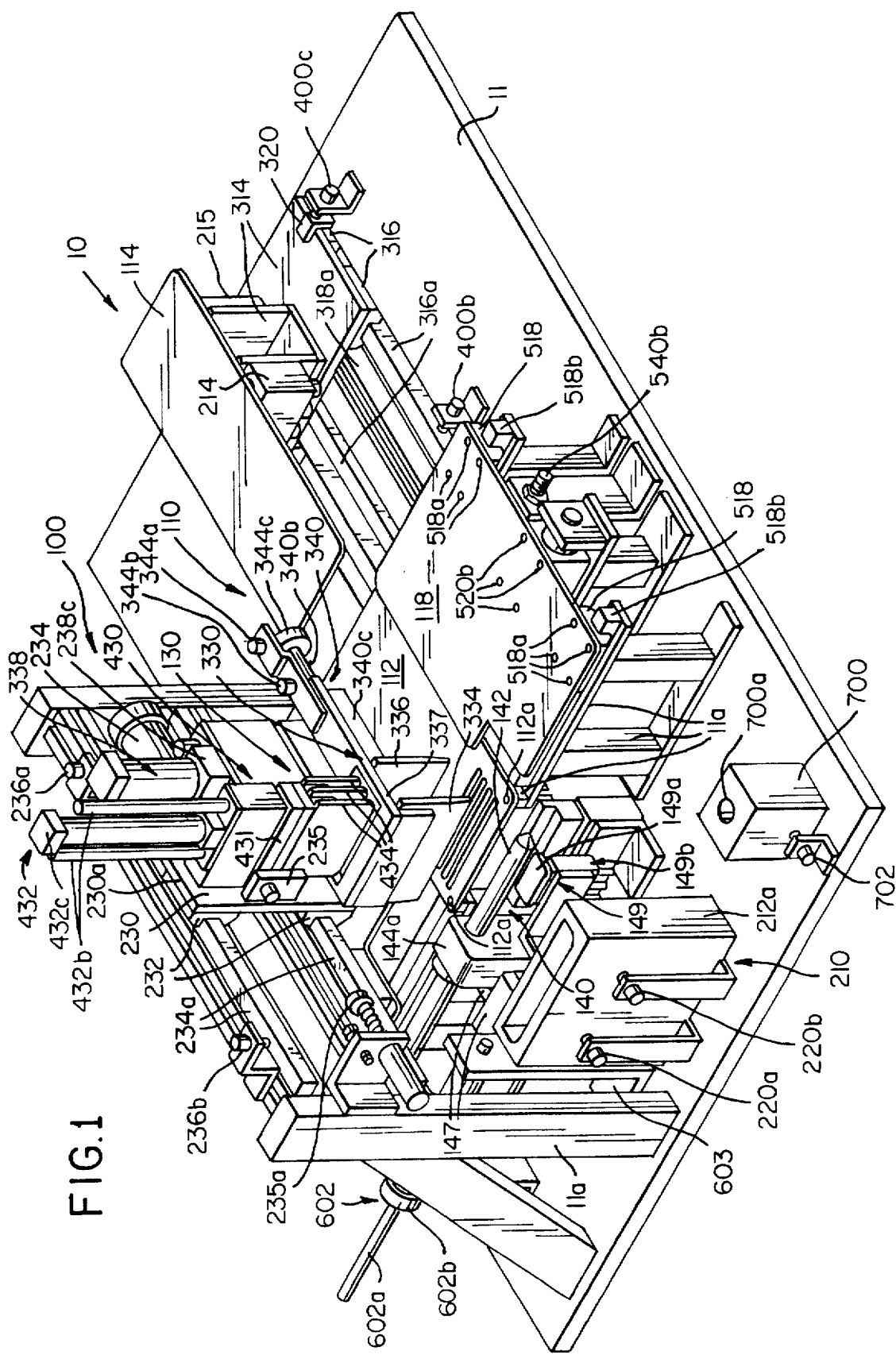
FIG. 1 is a perspective view of an apparatus for folding an inflatable cushion having an end portion and a main body portion and inserting the folded cushion into a cover.
Figure 17:
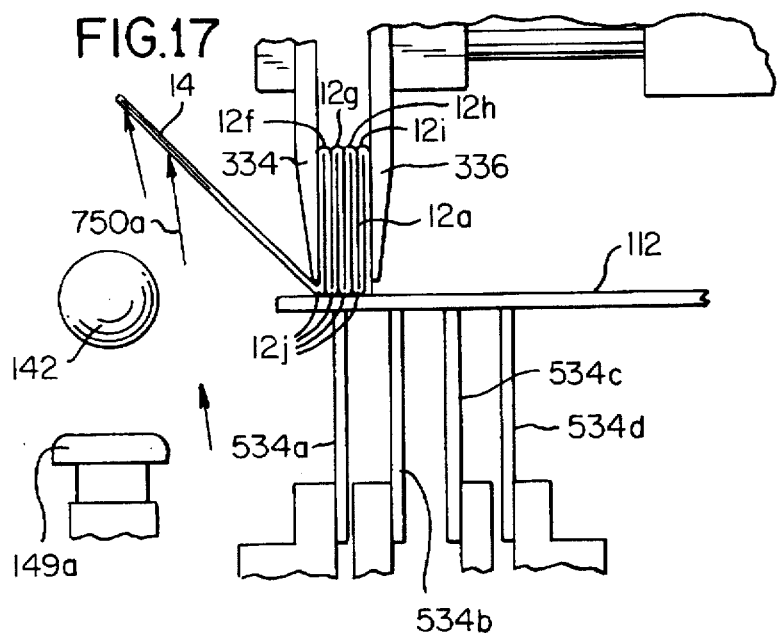

Reference is now made to FIG. 1, which illustrates an apparatus 10 constructed in accordance with the present invention for folding an inflatable cushion 12 having a looped end portion 14 and a main body portion 16, see FIG. 5, and inserting the folded cushion 12a into a cover or jacket 200a, see FIG. 19. The apparatus 10 comprises folding structure 100 for creating in the main body portion 16 first and second generally parallel folds 18 and 19, see FIG. 8, and a plurality of accordion folds, first, second, third and fourth folds 12f–12i in the illustrated embodiment, which are generally transverse to the first and second folds 18 and 19 to form a folded cushion 12a, see FIG. 17. The folding structure 100 further serves to insert the folded cushion 12a into the cover 200a, see FIG. 19. The apparatus 10 also includes apparatus 210 for supporting the cover 200a into which the folded cushion 12a is inserted, see FIG. 1.

The folding structure 100 comprises first folding apparatus 110 for creating the first and second folds 18 and 19 in the main body portion 16 of the cushion 12 to form the partially folded cushion 12b, see FIGS. 1 and 8. The folding structure 100 also comprises accordion folding apparatus 130 and a mandrel assembly 140, see FIGS. 1 and 2. The accordion folding apparatus 130 creates the accordion folds 12f–12i in the partially folded cushion 12b to form the folded cushion 12a, see FIGS. 12–16. The mandrel assembly 140 includes a mandrel 142 which extends through the looped end portion 14 of the cushion 12 while the folds 18, 19 and 12f–12i are being formed.

The mandrel assembly 140 includes first and second bearing blocks 144a and 144b which slidably receive the mandrel 142. The mandrel 142 is movable between a looped end portion engagement position, shown, for example, in FIGS. 1–3 and 5, and a retracted position, shown in FIG. 17. Further provided is a conventional pneumatic rodless cylinder unit 146 having a cylinder 146a and a saddle 146b which is positioned about and reciprocates along the outer surface of the cylinder 146a. A mandrel connector element 147 couples the mandrel 142 to the saddle 146b such that linear movement of the saddle 146b effects linear movement of the mandrel 142 to one of its looped end portion engagement position and its retracted position.

First and second conventional proximity sensors 148a and 148b are fixedly mounted to the bearing blocks 144a and 144b, respectively. Sensor 148b senses the connector element 147 when the mandrel 142 is in its retracted position and, upon sensing element 147, generates a mandrel retracted position signal to an apparatus control processor 400. Sensor 148a senses the connector element 147 when the mandrel 142 is in its extended or engagement position and, upon sensing element 147, generates a mandrel engagement position signal to the apparatus control processor 400.

Figure 12:
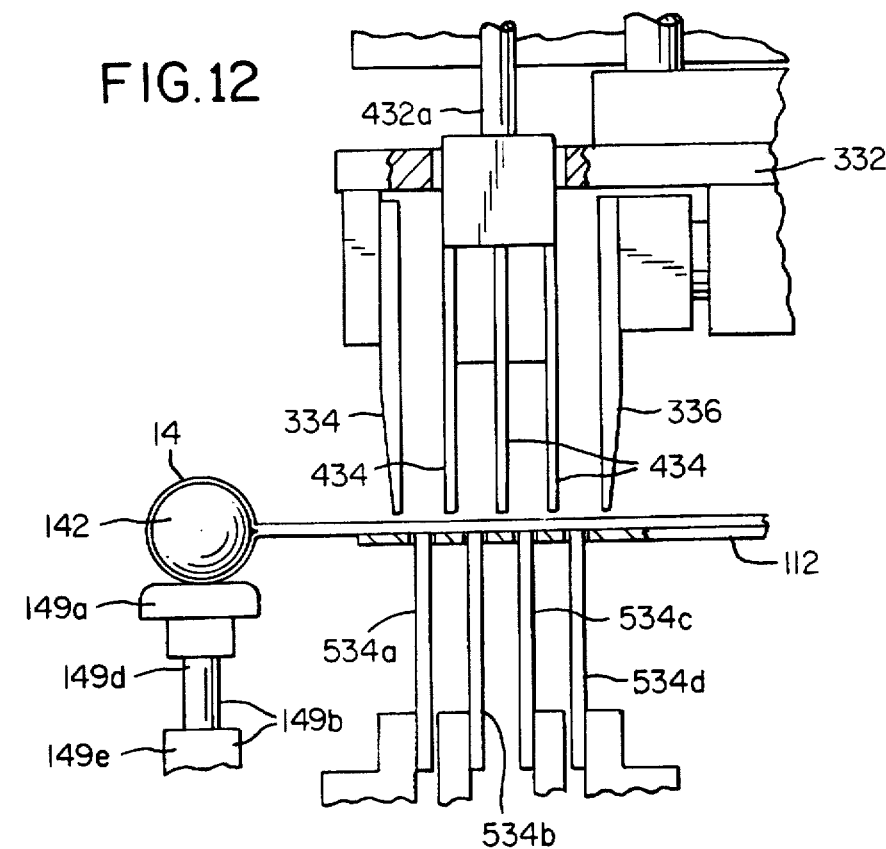
Figure 13:
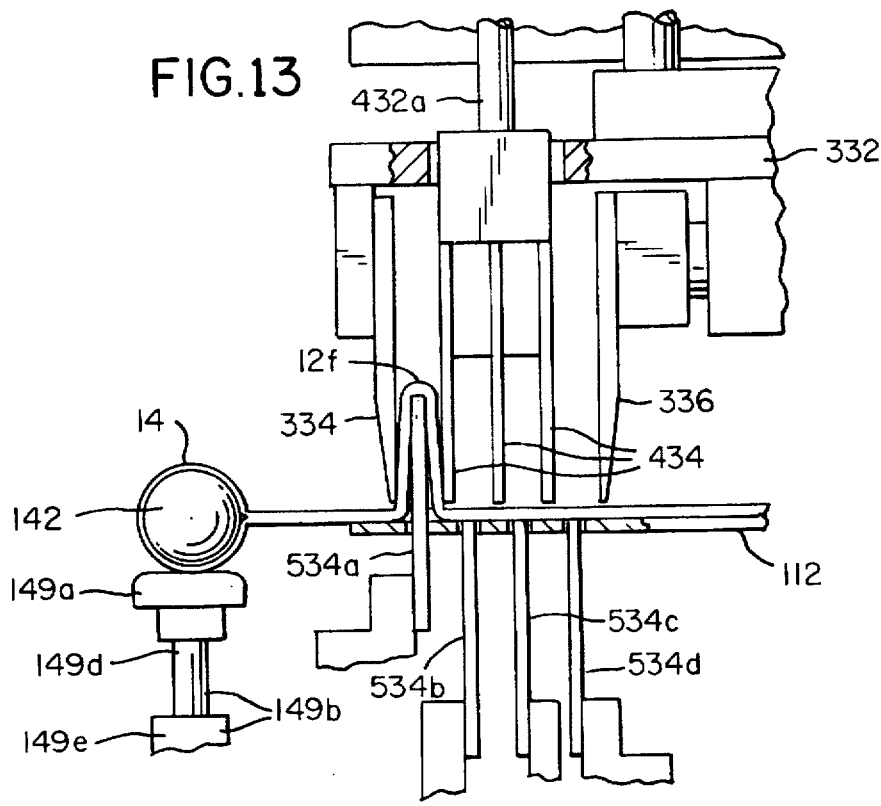

The mandrel assembly 140 further includes a mandrel clamping unit 149. The clamping unit 149 comprises a clamping member 149a and a piston/cylinder device 149b, see FIGS. 1, 2, 12 and 13. The piston/cylinder device 149b includes a piston (not shown) and a pair of guide rods 149d (only one of which is shown in FIGS. 12 and 13) which are fixedly connected to the clamping member 149a and a cylinder unit 149e from which the piston and the guide rods 149d extend. Movement of the piston effects vertical movement of the clamping member 149a between a looped end clamping position, shown in FIGS. 12 and 13, and a retracted position, shown in FIG. 2. A proximity sensor 149f is positioned on a bracket 149g which, in turn, is fixedly mounted to the main plate 11. The sensor 149f senses a flag 149h on one of the guide rods 149d when the clamping member 149a is positioned in its looped end portion clamping position and, upon sensing the flag 149h, generates a looped end portion clamped signal to the processor 400. In the illustrated embodiment, a proximity sensor is not provided for sensing when the clamping member 149a is in its retracted position.

The first folding apparatus 110 includes a base plate 112, a movable center plate 114 and first and second fold tables 116 and 118. The base plate 112 is fixedly secured to a main frame plate 11 via support structure 11a and bolts 112a, see FIGS. 1 and 3.

The movable center plate 114 is connected to a pneumatic piston/cylinder unit 214 which effects vertical up and down movement of the center plate 114. Arrow 300 in FIG. 2 designates the vertical movement of the plate 114. The piston/cylinder unit 214 includes a piston 214a and a pair of guide rods 214b which are fixedly connected to the movable plate 114 and a cylinder unit 214c from which the piston 214a and the guide rods 214b extend, see FIGS. 2 and 3. Movement of the piston 214a effects vertical movement of the center plate 114. Also provided is a support unit 215 which includes a non-driven support shaft 215a fixedly connected to the center plate 114 and a linear bearing unit 215b from which the shaft 215a extends. The shaft unit 215 provides support for an end portion 114a of the plate 114.

The piston/cylinder unit 214 and the support unit 215 are fixedly mounted to a bracket 314. The bracket 314, in turn, is fixedly mounted to a plurality of slide members 316 which move linearly along guide elements or tracks 316a. The bracket 314 is further coupled to a saddle 318 of a conventional pneumatic rodless cylinder unit 318a. Horizontal movement of the saddle 318 toward and away from the fixed base plate 112 effect horizontal movement of the center plate 114 along the guide elements 316a toward and away from the base plate 112.

First, second and third conventional proximity sensors 400a–400c are provided to sense the position of the plate 114. Sensor 400a is mounted to the bracket 314, see FIG. 2. It senses when the plate 114 is in its down position, as shown in FIGS. 6–8, and generates a down position signal to the apparatus control processor 400. Sensors 400b and 400c are mounted on the main frame plate 11, see FIG. 3. When the plate 114 is in its forward position, as shown in FIGS. 6–8, the sensor 400b senses a flag 320 mounted to the bracket 314 and generates a forward position signal to the processor 400. When the plate 114 is in its rearward position, as shown in FIG. 5, the sensor 400c senses the flag 320 and generates a rearward position signal to the processor 400.

The movable center plate 114 is adapted to move from a retracted position, where it is in its rearward and up position, see FIG. 5, to an engagement position, where it is in its down and forward position, see FIGS. 6–8. When the center plate 114 is in its engagement position, it engages the central section 16a of the main body portion 16 such that the central section 16a is clamped between the base plate 112 and the movable center plate 114, see FIG. 6.

The first fold table 116 is movable from a retracted position, shown in FIGS. 5 and 6, to a first fold position, shown in FIG. 7, so as to create the first fold 18 in the cushion 12. The first fold table 116 is mounted to first and second slide members 418 via bolts 418a, see FIGS. 3 and 4. The slide members 418 are linearly movable along guide elements or tracks 418b, which are fixedly secured to the support structure 11a via bolts 418c. The first fold table 116 is further coupled via bolts 117 to a saddle 420 of a conventional pneumatic rodless cylinder unit 420a. Horizontal movement of the saddle 420 toward and away from the fixed base plate 112 effect horizontal movement of the first fold table 116 along the guide elements 418b toward and away from the base plate 112.

Figure 4:
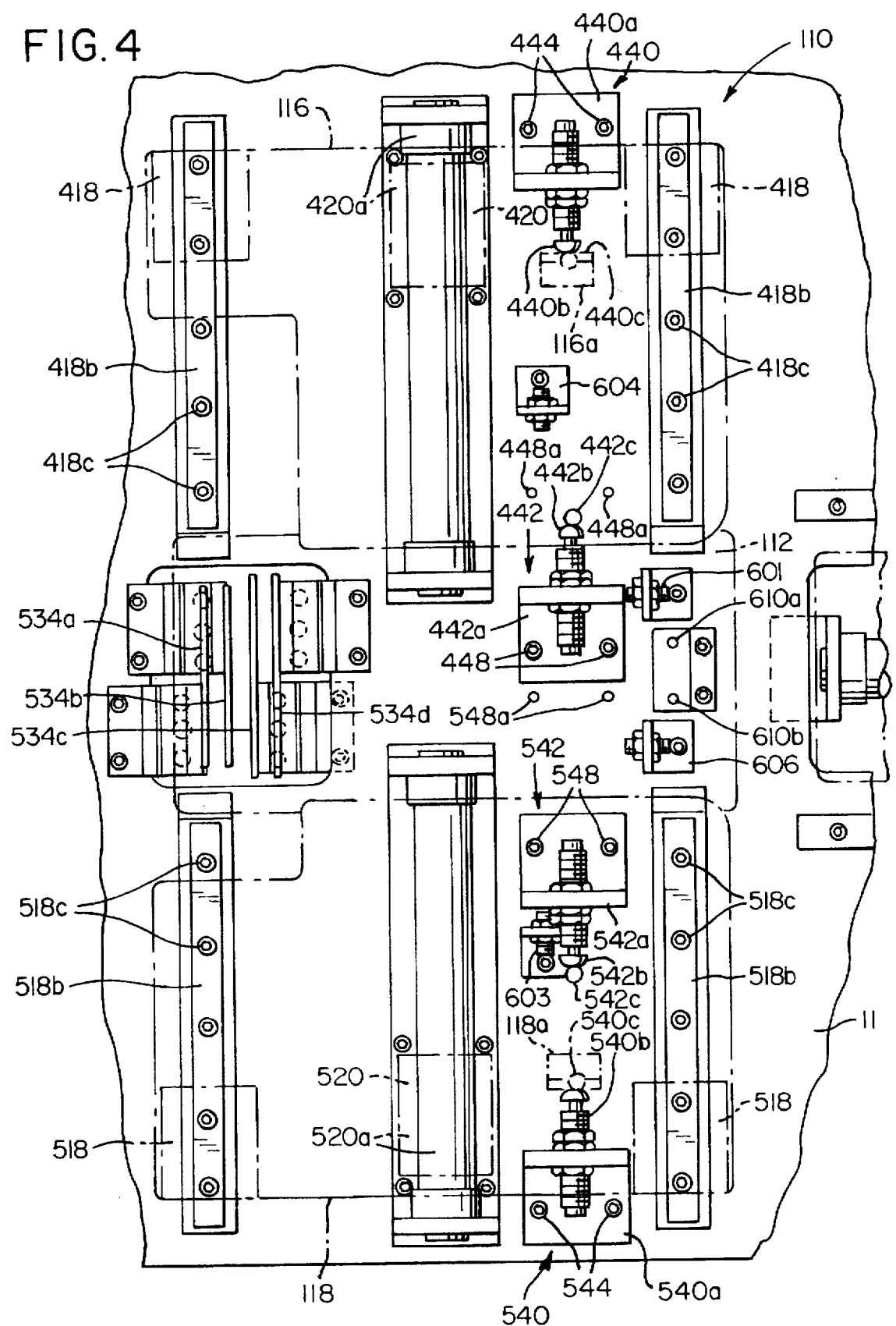
FIG. 4 is a plan view of first folding apparatus of the apparatus of FIG. 1 with the base plate, the center plate and the first and second fold tables shown in phantom.

The first fold table 116 is provided on its bottom surface or underside with a first stop block 116a, see FIG. 4. First and second bracket assemblies 440 and 442 are mounted to the main frame plate 11 via bolts 444 and 448, respectively. The first bracket assembly 440 comprises a first bracket 440a which supports a first shock absorber unit 440b and a first bracket proximity sensor 440c. The second bracket assembly 442 comprises a second bracket 442a which supports a second shock absorber unit 442b and a second bracket proximity sensor 442c. As noted above, the saddle 420 effects movement of the first fold table 116 toward and away from the base plate 112. The first shock absorber unit 440b engages the stop block 116a as the table 116 is moved away from the base plate 112 to its retracted position. By engaging the stop block 116a, the first shock absorber unit 440b limits the distance that the first fold table 116 moves away from the base plate 112 and, hence, defines the retracted position of the first fold table 116. The second shock absorber unit 442b engages the stop block 116a as the table 116 moves toward the base plate 112 to its first fold position. By engaging the stop block 116a, the second unit 442b limits the distance that the first fold table 116 moves toward the base plate 112 and, hence, defines the first fold position of the first fold table 116.

The first bracket proximity sensor 440c senses the stop block 116a when the first fold table 116 is in its retracted position and generates a first fold table retracted position signal to the processor 400. The second bracket proximity sensor 442c senses the stop block 116a when the first fold table 116 is in its first fold position and generates a first fold table folding position signal to the processor 400.

The second fold table 118 is movable from a retracted position, shown in FIGS. 5–7, to a second fold position, shown in FIG. 8, so as to create the second fold 19 in the cushion 12. The second fold table 118 is mounted to third and fourth slide members 518 via bolts 518a, see FIGS. 1–4. The slide members 518 are movable linearly along guide elements or tracks 518b, which are fixedly secured to the support structure 11a via bolts 518c, see FIG. 4. The second fold table 118 is further coupled to a saddle 520 of a conventional pneumatic rodless cylinder 520a via bolts 520b. Horizontal movement of the saddle 520 toward and away from the fixed base plate 112 effects horizontal movement of the second fold table 118 along the guide elements 518b toward and away from the base plate 112.

The second fold table 118 is provided on its bottom surface or underside with a second stop block 118a. Third and fourth bracket assemblies 540 and 542 are mounted to the main frame plate 11 via bolts 544 and 548, respectively. The third bracket assembly 540 comprises a third bracket 540a which supports a third shock absorber unit 540b and a third bracket proximity sensor 540c. The fourth bracket assembly 542 comprises a fourth bracket 542a which supports a fourth shock absorber unit 542b and a fourth bracket proximity sensor 542c. As noted above, the saddle 520 effects movement of the second fold table 118 toward and away from the base plate 112. The third shock absorber unit 540b engages the stop block 118a as the table 118 is moved away from the base plate 112 to its retracted position. By engaging the stop block 118a, the third shock absorber unit 540b limits the distance that the second fold table 118 moves away from the base plate 112 and, hence, defines the retracted position of the second fold table 118. The fourth shock absorber unit 542b engages the stop block 118a as the table 118 is moved toward the base plate 112 to its second fold position. By engaging the stop block 118a, the fourth shock absorber unit 542b limits the distance that the second fold table 118 moves toward the base plate 112 and, hence, defines the second fold position of the second fold table 118.

The third bracket proximity sensor 540c senses the stop block 118a when the second fold table 118 is in its retracted position and generates a second fold table retracted position signal to the processor 400. The fourth bracket proximity sensor 542c senses the stop block 118a when the second fold table 118 is in its second fold position and generates a second fold table folding position signal to the processor 400.

Figure 9:
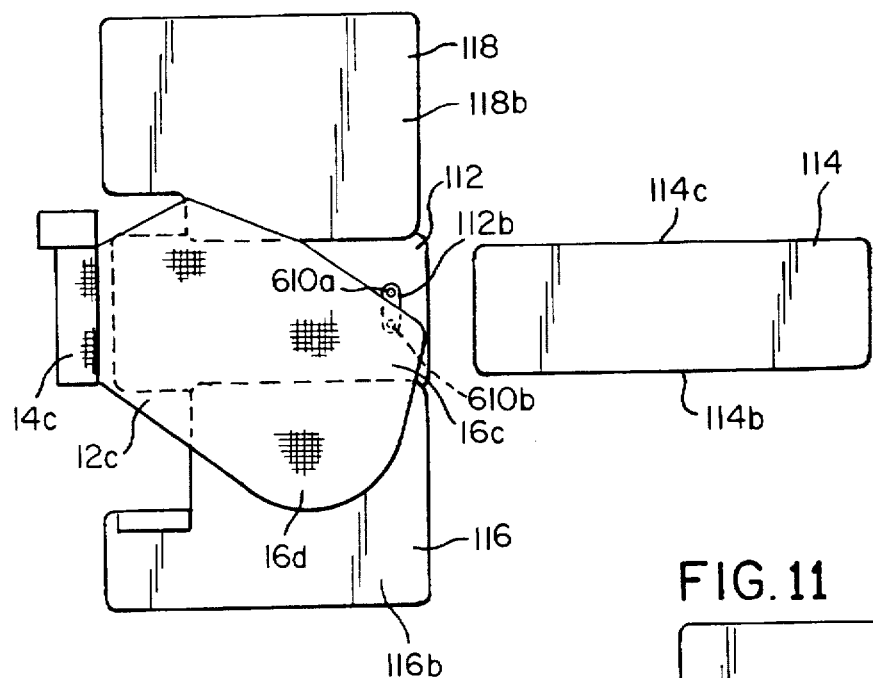
FIGS. 9–11 illustrate the first folding apparatus, after the first and second fold tables have been reversed, effecting a second folding sequence to form a partially folded second inflatable cushion, which cushion is adapted to be placed on a second side of a vehicle.

First and second inflatable cushions 12 and 12c, such as a driver's side air bag and a passenger's side air bag, which air bags 12 and 12c are respectively shown in FIGS. 5 and 9, may be folded using the apparatus 10. The driver's side air bag 12 and the passenger's side air bag 12c are adapted to be located on opposite sides of a vehicle passenger compartment. In the illustrated embodiment, a first cushion 12 may be used as a second cushion 12c by merely turning the first cushion 12 over such that its first side section 16d is closest to a first side 114b of the center plate 114, as shown in FIG. 9, rather than to a second side 114c of the center plate 114. In the FIG. 5 embodiment, the first side section 16d is closest to the second side 114c of the center plate 114.

When a first inflatable cushion 12 is to be folded, the second and fourth bracket assemblies 442 and 542 are positioned and coupled to the main frame plate 11 in the manner illustrated in FIG. 4. The first and second folding tables 116 and 118 are also coupled to the slide members 418 and 518 and to the saddles 420 and 520 in the manner illustrated in FIGS. 1–4. Proximity sensors 601 and 603 sense respectively when the bracket assemblies 442 and 542 are in their first inflatable cushion folding positions and generate first bracket signals to the processor 400. The processor 400 will not allow a first cushion 12 to be folded unless it receives first bracket signals from the sensors 601 and 603.

Before a second inflatable cushion 12c is folded, the following modifications are made to the first folding apparatus 110. The first fold table 116 is removed from the first and second slide members 418 and the saddle 420. The second fold table 118 is also removed from the third and fourth slide members 518 and the saddle 520. The second bracket assembly 442 is moved toward the first bracket assembly 440 and is positioned on the main frame plate 11 such that the bolts 448 threadedly engage threaded bores 448a in the plate 11. Also, the fourth bracket assembly 542 is moved away from the third bracket assembly 540 and is positioned on the main frame plate 11 such that the bolts 548 threadedly engage threaded bores 548a in the main frame plate 11. Proximity sensors 604 and 606 sense respectively when the bracket assemblies 442 and 542 are in their second inflatable cushion folding positions and generate second bracket signals to the processor 400. The processor 400 will not allow a second cushion 12c to be folded unless it receives second bracket signals from the sensors 604 and 606.

Figure 11:
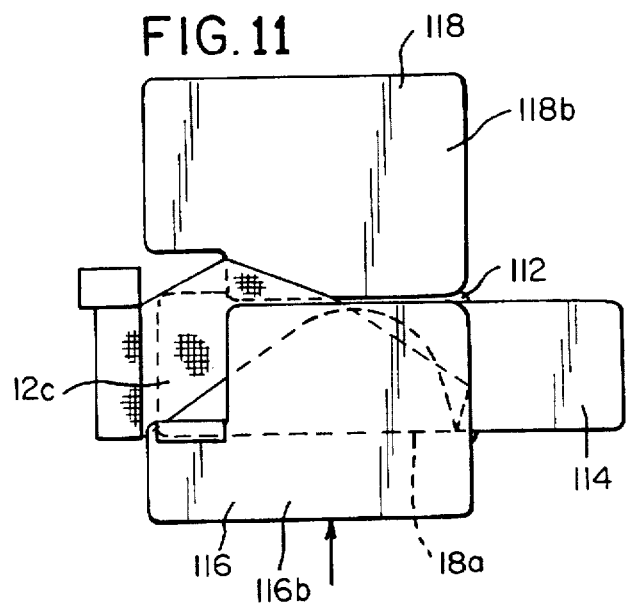

After the bracket assemblies 442 and 542 have been moved, the first fold table 116 is rotated such that its lower surface 116b is facing upward, compare FIGS. 5 and 9. The table 116 is then coupled to the third and fourth slide members 518 and the saddle 520. The second fold table 118 is also rotated such that its lower surface 118b is facing upward and it is coupled to the first and second slide members 418 and the saddle 420. The first and second fold tables 116 to 118, now located on opposite sides of the base plate 112, create first and second folds (only fold 18a is illustrated, see FIG. 11) in the main body portion 16c of the cushion 12c to form a partially folded cushion (not shown).

Figure 3:
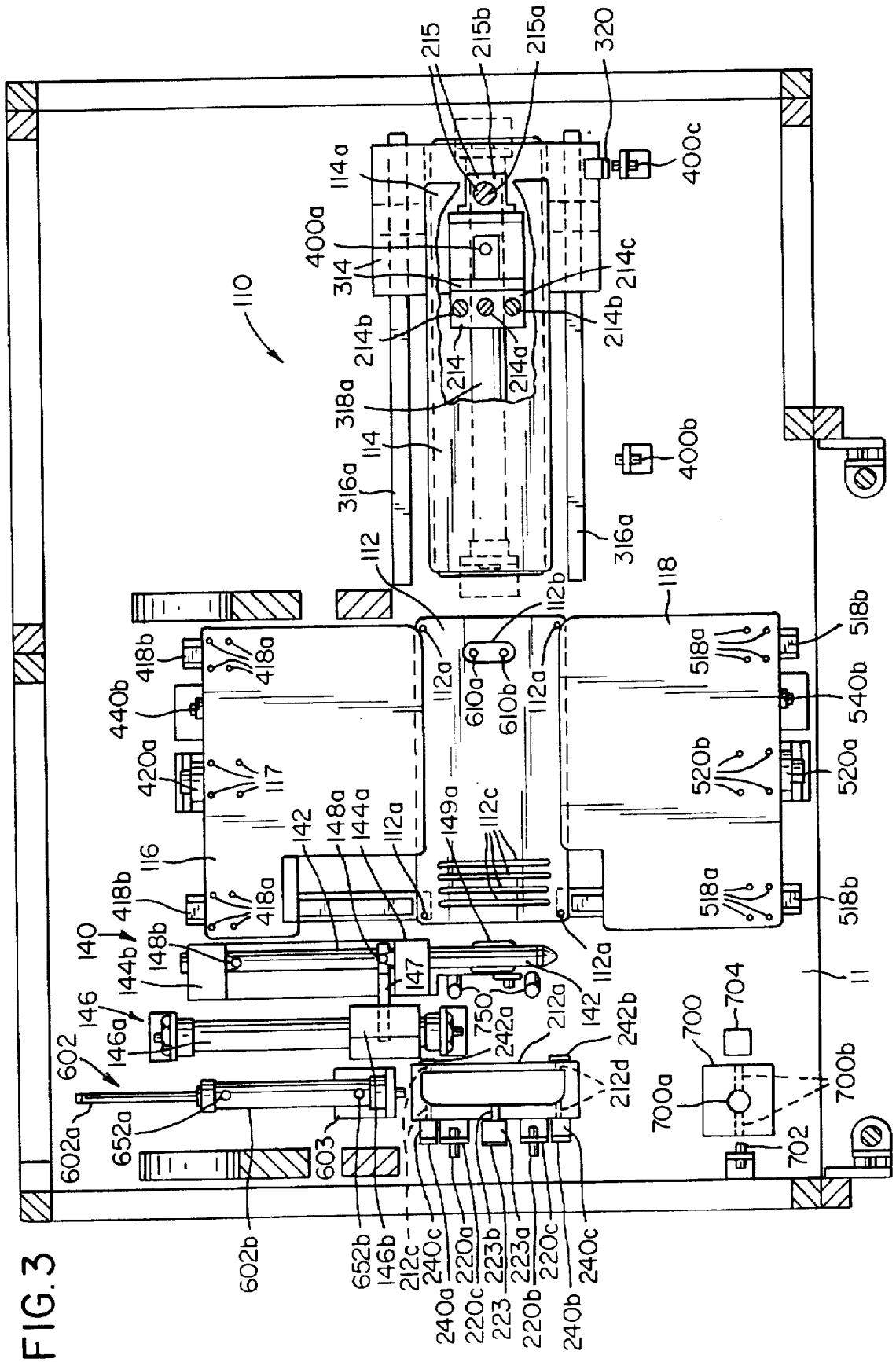
FIG. 3 is a plan view of the apparatus illustrated in FIG. 1 with the main carriage and a portion of the movable center plate removed.

First and second cushion photosensors 610a and 610b are provided on the base plate 11, see FIGS. 3, 4 and 9. A slot 112b is provided in the base plate 112 to allow light from the photosensors 610a and 610b to pass through the plate 112. When a first cushion 12 is position on the base plate 112 to be folded, as shown in FIGS. 5–8, a section of the first cushion 12 extends across the slot 112b such that light emitted by the first photosensor 610a is reflected by the first cushion 12 back toward the photosensor 610a. The first photosensor 610a then generates a signal to the processor 400 indicating that a first cushion is positioned on the base plate 112. The processor 400 will only allow the folding of a first cushion 12 to occur if it receives a signal from the first photosensor 610a.

When a second cushion 12c is positioned on the base plate 112 to be folded, as shown in FIG. 9, a section of the second cushion 12c extends over the slot 112b such that light emitted by the second photosensor 610b is reflected by the second cushion 12c back toward the photosensor 610b. The second photosensor 610b then generates a signal to the processor 400 indicating that a second cushion 12c is positioned on the base plate 112. The processor 400 will only allow the folding of a second cushion 12c to occur if it receives a signal from the second photosensor 610b.

Figure 4B:
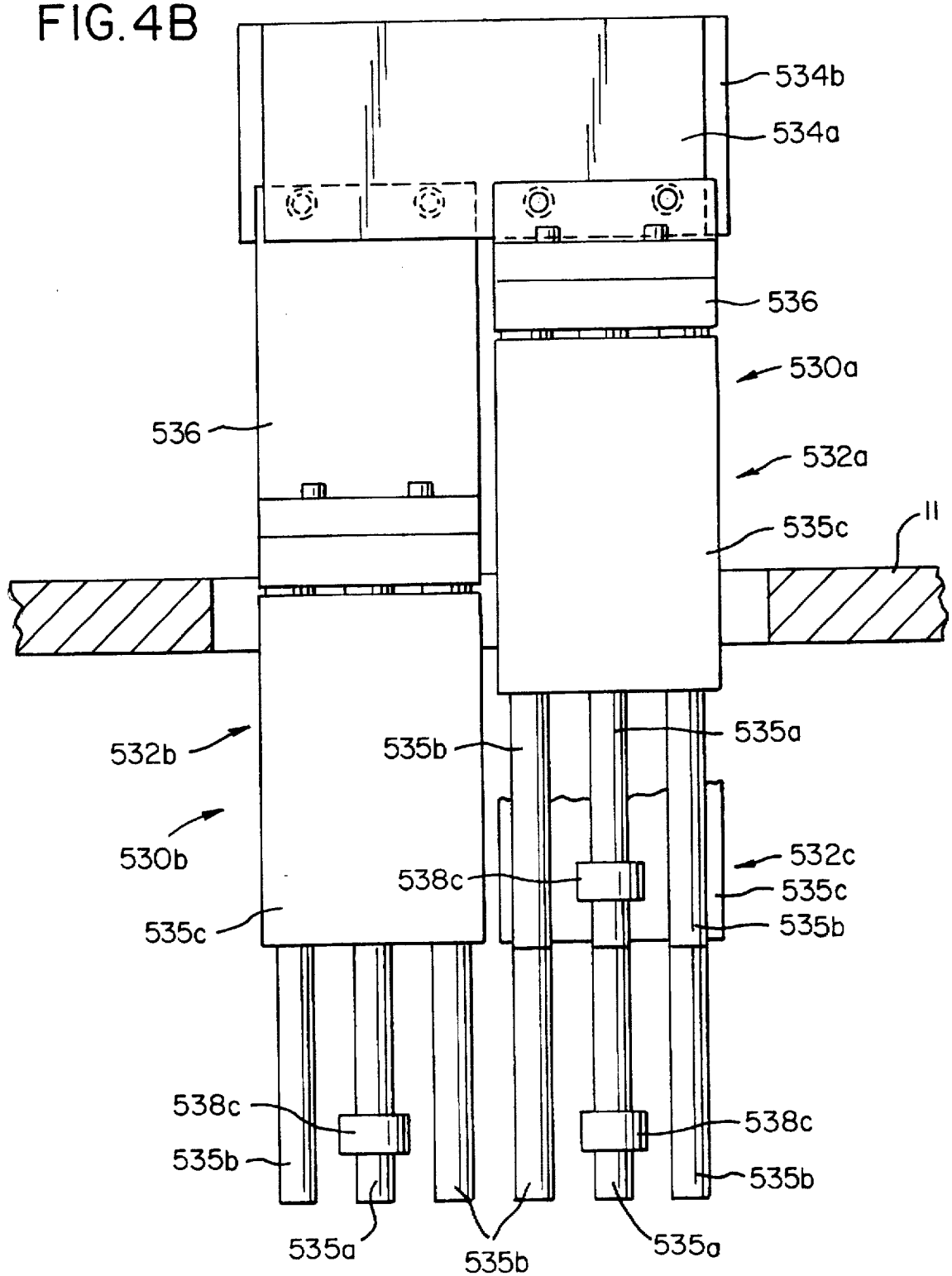
FIG. 4B is a view taken along view line 4B—4B in FIG. 4A.

The accordion folding apparatus 130 comprises a main upper carriage 230, an upper clamping and inserting apparatus 330, an upper accordion fold device 430 and first, second, third and fourth lower accordion fold devices 530a–530d, see FIGS. 4A and 4B.

Figure 2:
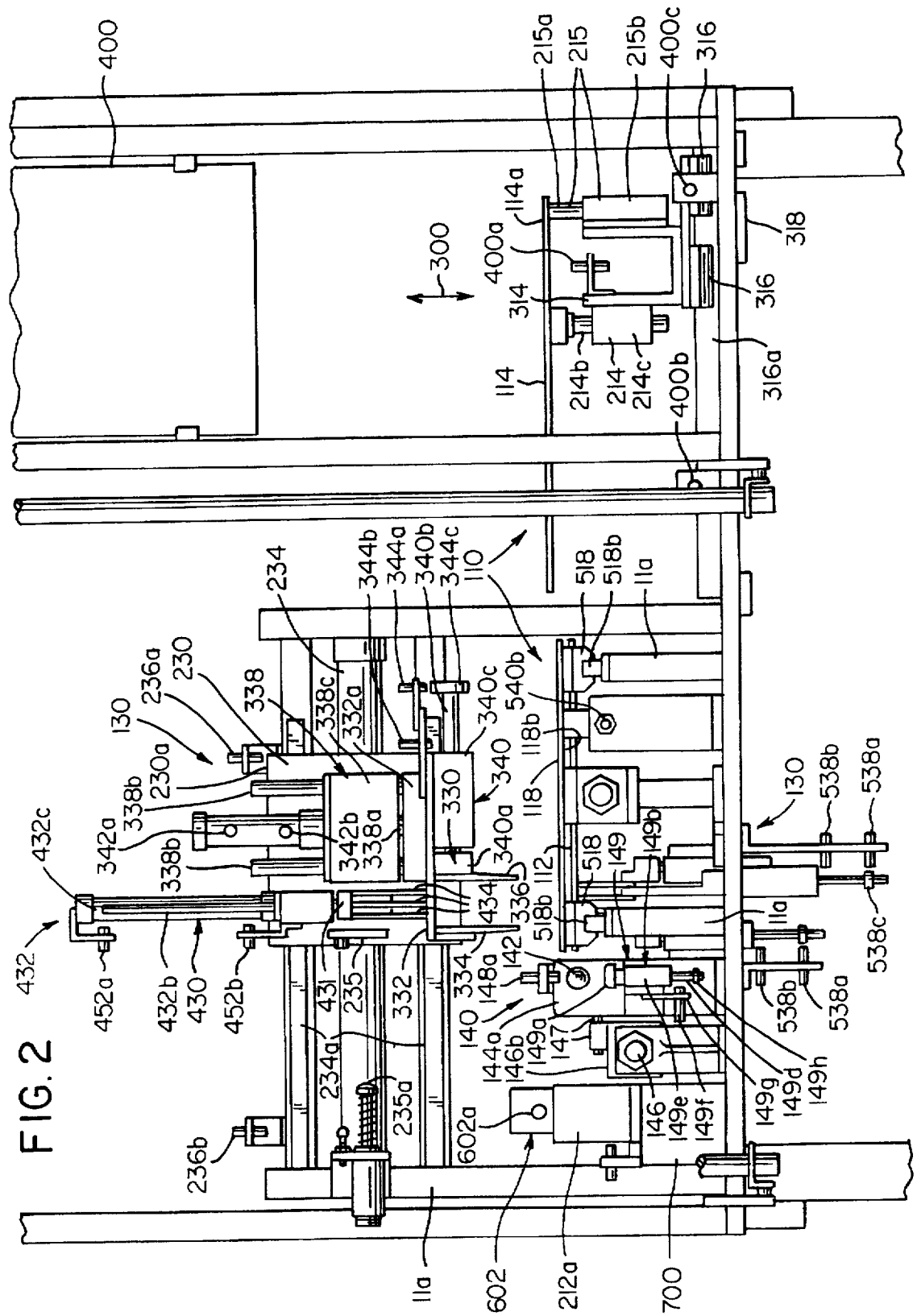
FIG. 2 is a front view of the apparatus illustrated in FIG. 1.

The main upper carriage 230 is fixedly connected to first, second, third and fourth slide elements 232 (only two of which are shown, see FIG. 1) and to a saddle (not shown) of a pneumatic rodless cylinder unit 234, see FIGS. 1 and 2. The slide elements 232 are slidably coupled to tracks 234a which, in turn, are coupled to support structure 11a. The main upper carriage 230 is movable back and forth via the saddle of the unit 234 between a folding position, shown in FIGS. 1 and 2, and an inserting position where it is positioned over the cover supporting apparatus 210. A stop plate 235 is provided on the carriage 230 and, as the carriage 230 moves to its inserting position, engages a shock absorber 235a.

Proximity sensors 236a and 236b are provided to detect the position of the main upper carriage 230. The sensor 236a senses an upper surface 230a of the upper carriage 230 when the upper carriage 230 is in its folding position and generates an upper carriage folding position signal to the processor 400. The sensor 236b senses the upper surface 230a of the upper carriage 230 when the upper carriage 230 is in its inserting position and generates an inserting position signal to the processor 400.

The upper clamping and inserting apparatus 330 includes a base member 332, a first clamping member 334 fixedly connected to the base member 332, a second clamping member 336, a first piston/cylinder unit 338 which is fixedly coupled to the main upper carriage 230 and to the base member 332 for effecting movement of the base member 332 relative to the main upper carriage 230 and a second piston/cylinder unit 340 coupled to the base member 332 and the second clamping member 336 for effecting movement of the second clamping member 336 toward and away from the first clamping member 334.

The first piston/cylinder unit 338 comprises a piston 338a and a pair of guide rods 338b which are fixedly connected to the base member 332 via a block 332a, see FIG. 2. The unit 338 further includes a cylinder device 338c which is fixedly connected to the main upper carriage 230 via bolts (not shown). The piston and the guide rods 340b extend from the cylinder device 338c. Movement of the piston 338a effects up and down movement of the base member 332 and, hence, the first and second clamping members 334 and 336.

A magnetic band (not shown) is provided on the piston 338a. Two conventional magnetic reed switches 342a and 342b (shown only in FIG. 2) are provided on the cylinder device 338c and sense movement of the magnetic band on the piston 338a as the piston 338a moves the base member 332 to either its first retracted position, shown in FIGS. 1 and 2 or a second down position, shown in FIGS. 12 and 13.

The second piston/cylinder unit 340 comprises a piston (not shown) and a pair of guide rods 340b (only one of the guide rods 340b is shown in FIGS. 1 and 2) which are fixedly connected to a block 340a which, in turn, is fixedly connected to the second clamping member 336. The unit 340 further includes a cylinder device 340c which is fixedly connected to the base member 332. The piston and the guide rods 340b extend from the cylinder device 340c. Movement of the piston of the unit 340 effects horizontal movement of the second clamping member 336 toward and away from the fixed first clamping member 334.

Proximity sensors 344a and 344b are provided to detect the position of the second clamping member 336. The sensor 344a senses a flag 344c on one of the guide rods 340b when the second clamping member 336 is in its retracted position, shown in FIG. 13, and generates a second clamping member retracted position signal to the processor 400. The sensor 344b senses the flag 344c when the second clamping member 336 is in the position shown in FIG. 17 and generates a second clamping member clamped position signal to the processor 400.

The upper accordion fold device 430 includes a third piston/cylinder unit 432 and first, second and third upper accordion blades 434. The third piston/cylinder unit 432 comprises a piston 432a, see FIG. 12, and a pair of guide rods 432b, see FIG. 1, which are fixedly connected to a block 431 which, in turn, is fixedly connected to the upper blades 434. The unit 432 further includes a cylinder device 432c which is fixedly connected to the main carriage 230. The piston 432a and the guide rods 432b extend from the cylinder device 432c. Movement of the piston 432a effects vertical movement of the upper blades 434 between a retracted position, shown in FIG. 2, and an accordion fold position, shown in FIGS. 12 and 13.

A magnetic band (not shown) is provided on the piston 432a. Two conventional magnetic reed switches 452a and 452b (shown only in FIG. 2) are provided on the cylinder device 432c and sense movement of the magnetic band on the piston 432a as the piston 338a moves its associated upper blades 434 between retracted and accordion fold positions and generate corresponding signals to the processor 400.

The first lower accordion fold device 530a includes a first piston/cylinder unit 532a and a first lower fold blade 534a, see FIGS. 4, 4A and 4B. The second lower accordion fold device 530b includes a second piston/cylinder unit 532b and a second lower fold blade 534b. The third lower accordion fold device 530c includes a third piston/cylinder unit 532c and a third lower fold blade 534c. The fourth lower accordion fold device 530d includes a fourth piston/cylinder unit 532d and a fourth lower fold blade 534d. Each of the piston/cylinder units 532a–532d includes a piston 535a and a pair of guide rods 535b which are fixedly connected to a blade support member 536 which, in turn, is fixedly connected to one of the lower fold blades 534a–534d. Each unit 532a–532d further includes a cylinder device 535c which is fixedly connected to the main frame plate 11. The piston 535a and the guide rods 535b extend from the cylinder device 535c. Movement of the piston 535a effects vertical movement of its corresponding lower fold blade between a retracted position, shown in FIG. 12, and an accordion fold position, shown in FIG. 14. Slots 112c are provided in the base plate 112 to allow the lower fold blades 534a–534d to pass through the plate 112, see FIG. 3.

A pair of proximity sensors 538a and 538b are associated with each of the lower fold devices 530a–530d to detect the position of one of its associated guide rods 535b, see FIG. 4A. Sensor 538a senses flag 538c on the piston 535a when its corresponding fold blade 534a–534d is in its retracted position, and generates lower fold blade retracted position signal to the processor 400. The sensor 538b senses the flag 538c when its corresponding fold blade 534a–534d is in its fold position and generates a lower fold blade fold position signal to the processor 400.

The apparatus 10 further includes a stripper mechanism 600 comprising a piston/cylinder unit 602 mounted to the plate 11 via a bracket 603. As will be discussed below, the piston 602a, when it is extended out from cylinder 602b, engages an upper portion 12d of the folded cushion 12a to prevent the folded cushion 12a from moving away with the first and second clamping members 334 and 336 as they are moved away from the cover supporting apparatus 210 after the cushion 12a has been inserted into a cover 200a, see FIG. 19.

A magnetic band (not shown) is provided on the piston 602a. Two conventional magnetic reed switches 652a and 652b (shown only in FIG. 3) are provided on the cylinder device 602b and sense movement of the magnetic band on the piston 602a as the piston 602a moves between a retracted position, shown in FIG. 3, and a folded cushion engagement position, shown in FIG. 19, and generate corresponding signals to the processor 400.

Figure 22:
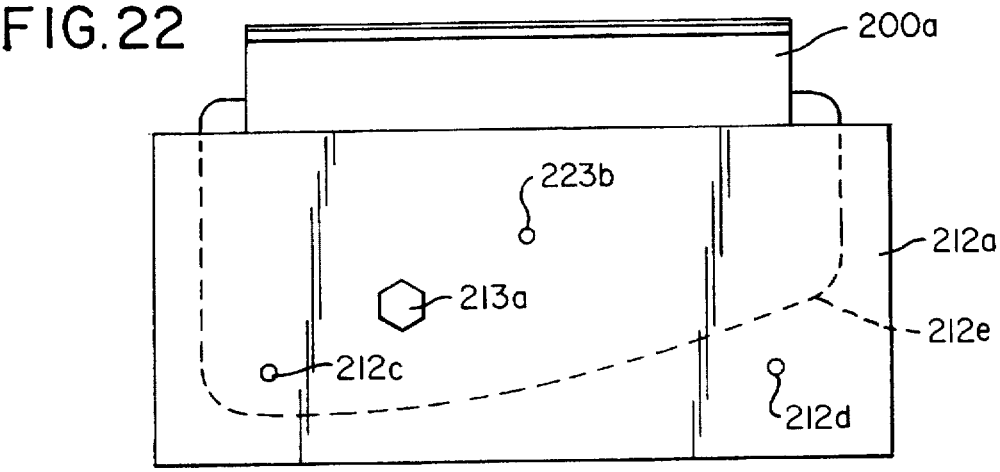
FIG. 22 is a side view of a first nest having a first inflatable cushion cover located in its recess.
Figure 23:
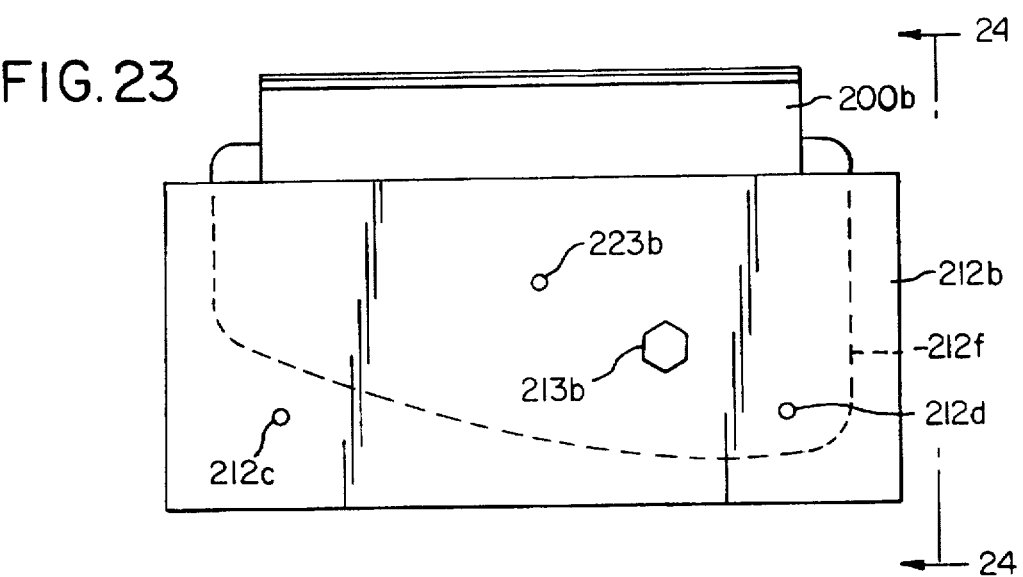
FIG. 23 is a side view of a second nest having a second inflatable cushion cover located in its recess.
Figure 24:
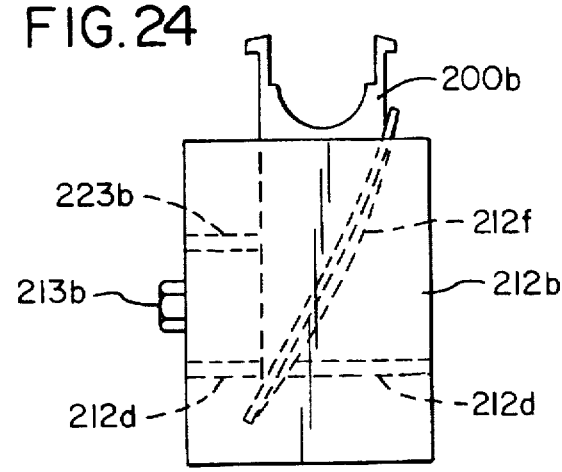
FIG. 24 is a view taken along view line 24—24 in FIG. 23.

The cover supporting apparatus 210 comprises a nest, either first nest 212a or second nest 212b, which is bolted or otherwise fixed to the plate 11, see FIGS. 1 and 3. In the illustrated embodiment, the first nest 212a receives and supports a first cover 200a which, in turn, is adapted to receive a first folded cushion 12a, see FIG. 22. A second nest 212b is substituted for the first nest 212a when a second cushion 12c is to be folded, see FIGS. 23 and 24. The second nest 212b is adapted to receive and support a second cover 200b which, in turn, is adapted to receive a folded second inflatable cushion 12e, see FIGS. 23 and 24. Thus, if a first inflatable cushion 12 is to be folded, the first nest 212a is bolted to the plate 11. If a second inflatable cushion 12c is to be folded, the second nest 212b is bolted to the plate 11 rather than the first nest 212a.

First and second proximity sensors 220a and 220b are mounted to brackets 220c which, in turn, are fixedly mounted to the plate 11, see FIG. 3. When the first nest 212a is coupled to the plate 11, the first proximity sensor 220a senses a bolt 213a (shown only in FIG. 22) provided on the first nest 212a and generates a first nest signal to the processor 400. The processor 400 will only allow the folding of a first cushion 12 to occur if it receives a first nest signal from the first proximity sensor 220a.

When the second nest 212b is coupled to the plate 11, the second proximity sensor 220b senses a bolt 213b (shown only in FIGS. 23 and 24) provided on the second nest 212b and generates a second nest signal to the processor 400. The processor 400 will only allow the folding of a second cushion 12c to occur if it receives a second nest signal from the second proximity sensor 220b.

First and second photosensors 240a and 240b (shown only in FIG. 3) are mounted to brackets 240c which, in turn, are bolted or otherwise fastened to the plate 11. Further, first and second light reflectors 242a and 242b are also mounted to the brackets 240c. The first and second nests 212a are each provided with first and second pairs of through holes 212c and 212d, see FIGS. 22–24.

When a first cover 200a is properly seated within a recess 212e provided in the first nest 212a, the light beam generated by the first photosensor 240a, which passes through one of the first through holes 212c in the first nest 212a, is blocked by the cover 200a, which is black in the illustrated embodiment. Hence, the first photosensor 240a does not generate a light beam sensed signal to the processor 400. The light beam from the second photosensor 240b, however, is not blocked by the cover 200a and passes through both holes 212d, is reflected off the second reflector 242b back to the photosensor 240b which generates a first cover signal to the processor 400. Only when the processor 400 does not receive a light beam sensed signal from the first photosensor 240a and does receive a first cover signal from the second photosensor 240b will it allow the folding of a first cushion 12 to go forward.

When a second cover 200b is properly seated within a recess 212f provided in the second nest 212b, the light beam generated by the second photosensor 240b, which passes through one of the second through holes 212d is blocked by the cover 200b, which is also black in the illustrated embodiment. Hence, the second photosensor 240b does not generate a light beam sensed signal to the processor 400. The light beam from the first photosensor 240a, however, is not blocked by the cover 200b and passes through both first holes 212c, is reflected off the first reflector 242a and travels back to the photosensor 240a which generates a second cover signal to the processor 400. Only when the processor 400 does not receive a light beam sensed signal from the second photosensor 240b and does receive a second cover signal from the first photosensor 240a will it allow the folding of a second cushion 12c to go forward.

A third photosensor 223 (shown only in FIG. 3) is mounted on a bracket 223a (shown only in FIG. 3). Each of the first and second nests 212a and 212b is provided with an opening 223b through which a light beam emitted by the photosensor 223 passes. If a label, e.g., a warning label (not shown) is provided on a cover 200a or 200b, light is reflected off the label back to the photosensor 223 which generates a label found signal to the processor 400. The processor 400 then allows the folding of the cushion 12 or 12c to go forward. If a label is not provided on the cover 200, a signal is not generated by the photosensor 223 and, in the illustrated embodiment, the folding of a cushion 12 or 12c does not occur.

In the illustrated embodiment, a cushion inflator holder 700 is fixedly mounted to the plate 11, shown in FIGS. 1–3. Further provided is a photosensor 702 and a through-beam receiver 704, both of which are mounted to the plate 11, see FIGS. 1 and 3. A pair of through holes 700b are provided in the holder 700, see FIG. 3. When an inflator (not shown) is provided in a recess 700a in the holder 700, light does not pass through to the receiver 704. Thus, the photosensor and receiver 702 and 704 generate a light-beam-not-received or an inflator-provided signal to the processor 400. When an inflator is not provided in the recess 700a, light from the photosensor 702 passes through the holes 700b to the receiver 704. Hence the photosensor 702 and the receiver 704 generate an-inflator-not-provided signal to the processor 400. The processor 400 will not allow the apparatus 10 to cycle unless it receives an inflator-provided signal from the photosensor 702 and the receiver 704.

The processor 400 receives the signals generated by each of the reed switches, proximity sensors and photosensors set out herein and controls the operation of each of the piston/cylinder units to effect the folding of the cushions 12 and 12c as described herein. A conventional control panel (not shown) is connected to the processor 400 and displays the status of each piston/cylinder unit, allows an operator to input commands for operating the various piston/cylinder units and displays error codes. The signals generated by the proximity sensors 148a, 148b, 149a, 149f, 400a–400c, 440c, 442c, 540c, 220a, 220b, 542c, 236a, 236b, 344a, 344b, 538a, 538b, 600, 601, 603 and 606, reed switches 342a, 342b, 452a, 452b, 652a, 652b and photosensors 240a, 240b, 223 described herein indicate to the processor 400 that various steps in the cycle or process have been completed so that the processor 400 can initiate subsequent steps.

The piston/cylinder units described herein are controlled via conventional control valve apparatus (not shown) which may comprise a plurality of control valves. The valves comprising the valve apparatus are controlled via the processor 400 so as to supply air to and vent air from the pneumatic piston/cylinder units described herein at appropriate times during a given folding cycle. A single valve may be provided for each of the piston/cylinder units or two or more piston/cylinder units may be associated with a single valve. The number and type of valves used will be readily apparent to one skilled in the art.

The operation of the apparatus 10 will now be described. When a first cushion 12 is to be folded, the first and second fold tables 116 and 118 are mounted in the manner shown in FIG. 5. Also, the first nest 212a is mounted to the plate 11. The process for folding the first cushion 12 and inserting the folded cushion 12a into a first cover 200a begins by loading the first cover 200a into the nest 212a. The looped end portion 14 of the first cushion 12 is fitted over the mandrel 142 and the clamping member 149a is moved to its looped end portion clamping position. The main body portion 16 of the cushion 12 is positioned across the base plate 112 and the first and second fold tables 116 and 118 as shown in FIG. 5.

The center plate 114 is moved via the saddle 318 and the piston/cylinder unit 214 from its retracted position, shown in FIG. 5, to its engagement position, shown in FIG. 6. The first fold table 116 is then moved toward the base plate 112 to its first fold position so as to create a first fold 18 in the cushion 12, see FIG. 7. Thereafter, the second fold table 118 is moved toward the base plate 112 to its second fold position so as to create a second fold 19 in the cushion 12, thereby creating a partially folded cushion 12b, see FIG. 8.

After the second fold 19 has been made, the center plate 114 is moved horizontally away from the partially folded cushion 12b via movement of the saddle 318. At about the same time, the base member 332 and, hence, the first and second clamping members 334 and 336, are moved from their retracted position, shown in FIGS. 1 and 2, to their down position, shown in FIGS. 12 and 13, via the piston 338a.

Following the downward movement of the base member 332, the upper accordion blades 434 are moved via the piston 432a from their retracted position to their accordion fold position adjacent to the base plate 112, shown in FIGS. 12 and 13. As the upper blades 434 are moved downwardly, the first lower fold blade 534a is moved upwardly, thereby creating a first accordion fold 12f in the cushion 12, see FIG. 13. Thereafter, the second, third and fourth lower accordion fold blades 534b–534d are sequentially moved upwardly to create folds 12g–12i in the cushion 12. FIG. 14 illustrates all of the lower fold blades 534a–534d positioned in their respective fold positions.

After the accordion folds 12f–12i have been created, the fourth lower fold blade 534d is moved to its retracted position, see FIG. 15. Thereafter, the second clamping member 336 is moved toward the third fold blade 534c via the piston of the unit 340 to retain the fourth fold 12i formed in the cushion 12b. The cylinder device 340c is then vented to atmosphere via the control valve apparatus such that second clamping member 336 moves slightly away from the third fold blade 534c, as shown in phantom in FIG. 15. As the device 340c is vented, the first and second fold tables 116 and 118 are moved to their respective retracted positions.

After the fold tables 116 and 118 have returned to their retracted positions, the upper accordion blades 434 are moved to their retracted position via the piston 432a. Thereafter, the second clamping member 336 is again moved toward the third fold blade 534c via the piston of the unit 340 to retain the fourth fold 12i created in the cushion 12b, see FIG. 16. The cylinder device 340c is subsequently vented to atmosphere such that second clamping member 336 moves slightly away from the third fold blade 534c, as shown in phantom in FIG. 16. The venting of the device 340c allows the third fold blade 534c to be easily retracted from the folded cushion 12a.

After the third fold blade 534c has been retracted, the second clamping member 336 is moved toward the second fold blade 534b to retain the folds 12h and 12i formed in the cushion 12b. The device 340c is then vented so as to allow the second fold blade 534b to be subsequently retracted. After the second fold blade 534b has been retracted, the second clamping member 336 is moved toward the first fold blade 534a to retain the folds 12g–12i created in the cushion 12. The device 340c is again vented to allow the first fold blade 534a to be subsequently retracted. Thereafter, the second clamping member 336 is moved toward the first clamping member 334 such that the folded cushion 12a is grasped between the first and second clamping members 334 and 336, see FIG. 17.

Figure 18:
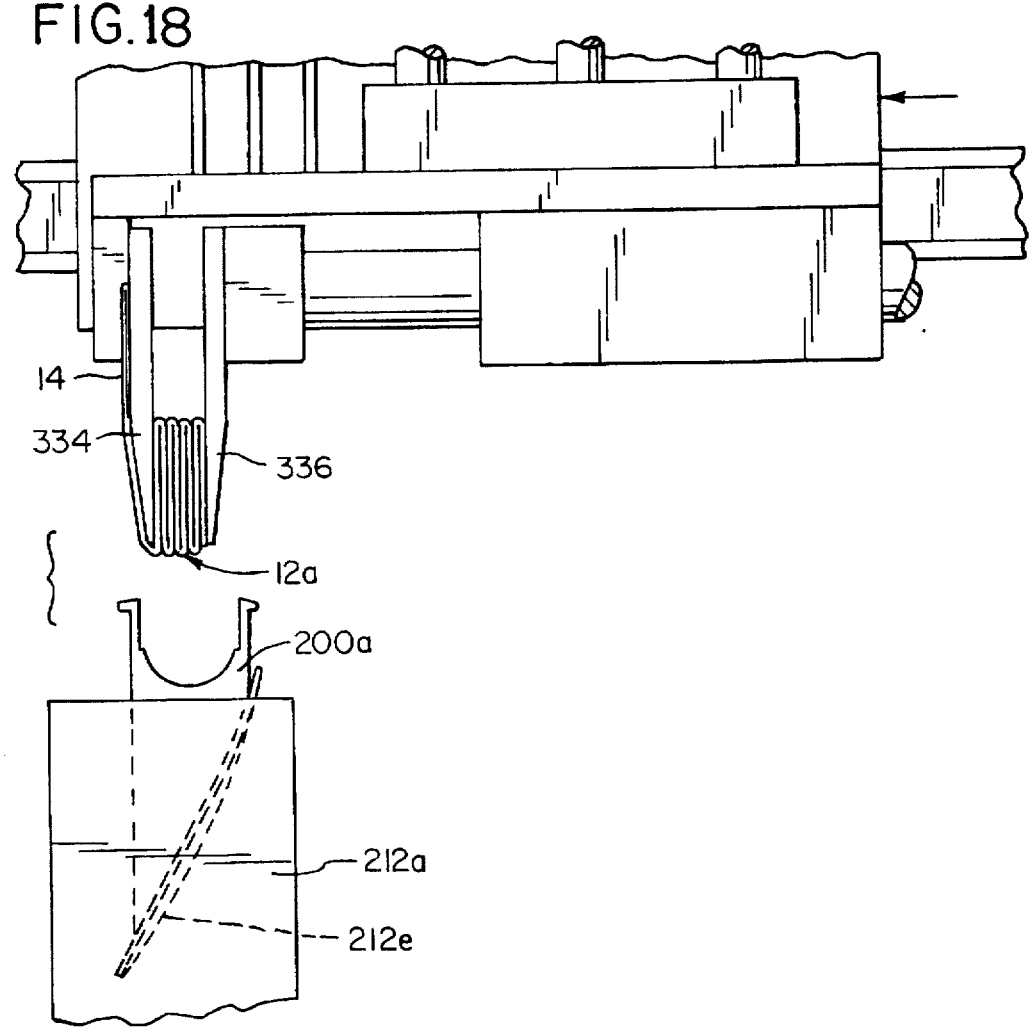

After the fold blades 534a–534d have been retracted from the cushion 12a, the clamping member 149a is moved to its retracted position followed by the mandrel 142 being moved to its retracted position. The main upper carriage 230 is then moved via the saddle of the unit 234 to its inserting position such that the folded cushion 12a is positioned over the first cover 200a which is seated in the first nest 212a. First and second pneumatic jet devices 750, shown only in FIG. 3, are provided for directing first and second air jets 750a toward the looped end portion 14 of the cushion 12a to prevent the looped end portion 14 from falling below the lower edges 12j of the folds 12f–12i, see FIGS. 17 and 18. The first and second clamping members 334 and 336 are lower via the piston 338a such that the folded cushion 12a is stuffed or inserted into the first cover 200a, see FIGS. 18 and 19. The device 340c is again vented.

The stripper mechanism piston 602a is moved to its folded cushion engagement position. The first and second clamping members 334 and 336 are then withdrawn from the first cover 200a via movement of the piston 338a. The piston rod 602a engages an upper portion 12d of the folded cushion 12a and prevents the folded cushion 12a from moving out of the cover 200a as the clamping members 334 and 336 are withdrawn.

Thereafter, the piston rod 602a is moved to its retracted position, the main upper carriage 230 is moved to its folding position, the second clamping member 336 is moved to its retracted position, and the movable center plate is moved vertically upward to its initial position via piston/cylinder unit 214.

The cover 200a having the folded cushion 12a therein is then manually removed from the nest 212a. An inflator (not shown) is subsequently combined with the cover 200a and the folded cushion 12a in a manner which will be apparent to those skilled in the art.

When a second cushion 12c is to be folded, the first and second fold tables 116 and 118 are removed and remounted in the manner shown in FIG. 9. Also, the second nest 212b is mounted to the plate 11.

The process for folding the second cushion 12c and inserting the folded second cushion 12e into a second cover 200b begins by loading the second cover 200b into the nest 212b. The looped end portion 14 of the second cushion 12c is fitted over the mandrel 142 and the clamping member 149a is moved to its looped end portion clamping position. The main body portion 16c of the cushion 12c is positioned across the base plate 112 and the first and second fold tables 116 and 118 as shown in FIG. 9.

Figure 10:
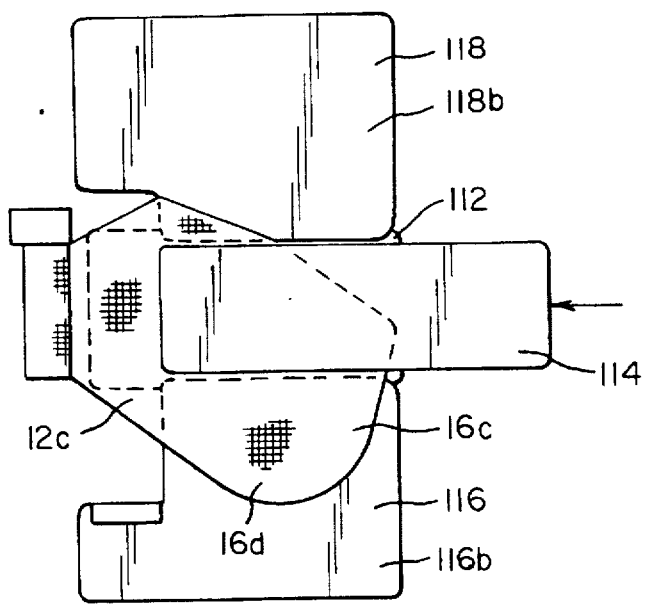

The center plate 114 is moved via the saddle 318 and the piston/cylinder unit 214 from its retracted position, shown in FIG. 9, to its engagement position, shown in FIG. 10. The first fold table 116 is then moved toward the base plate 112 to its first fold position so as to create a first fold 18a in the cushion 12c, see FIG. 11. Thereafter, the second fold table 118 is moved toward the base plate 112 to its second fold position so as to create a second fold (not shown) in the cushion 12c, thereby creating a partially folded cushion.

After the second fold has been made, the center plate 114 is moved horizontally away from the partially folded cushion via movement of the saddle 318. At about the same time, the base member 332 and, hence, the first and second clamping members 334 and 336, are moved from their retracted position, shown in FIGS. 1 and 2, to their down position, shown in FIGS. 12 and 13, via the piston 338a. Accordion folds 12f–12i are then created via the fold blades 434 and 534a–534d in the manner discussed above with regard to the first partially folded cushion 12b.

It is also contemplated that the apparatus 10 may be mounted on a folding engine such as the one disclosed in U.S. Pat. No. 5,575,748, the disclosure of which is hereby incorporated by reference.

Having described the invention in detail and by reference to preferred embodiments thereof, it will be apparent that modifications and variations are possible without departing from the scope of the invention which is defined in the appended claims.

What is claimed is:

1. An apparatus for folding an inflatable cushion having a looped end portion and a main body portion and inserting the folded cushion into a cover comprising:

folding structure for creating folds in said main body portion to form a folded cushion, said folding structure including a mandrel adapted to extend through said looped end portion of said cushion;

apparatus for supporting a cover into which said folded cushion is inserted; and said folding structure inserting said folded cushion into said cover.

2. An apparatus as set forth in claim 1, further including a mandrel clamping device which includes a clamping member adapted to clamp said looped end portion to said mandrel.

3. An apparatus as set forth in claim 1, wherein said folding structure further comprises:

first folding apparatus adapted to create a first fold in said main body portion of said cushion to form a partially folded cushion; and accordion folding apparatus adapted to create at least one accordion fold in said partially folded cushion which is generally transverse to said first fold to form said folded cushion.

4. An apparatus as set forth in claim 3, wherein said accordion folding apparatus comprises:

a main upper carriage which is movable back and forth between a folding position and an inserting position;

upper clamping and inserting apparatus including a base member, a first clamping member fixedly connected to said base member, a second clamping member, a first piston/cylinder unit coupled to said base member and said main upper carriage for effecting movement of said base member relative to said main upper carriage, and a second piston/cylinder unit coupled to said base member and said second clamping member for effecting movement of said second clamping member toward and away from said first clamping member;

an upper accordion fold device including a third piston/cylinder unit and upper accordion blades, said third piston/cylinder unit being coupled to said main carriage and to said upper accordion blades for effecting movement of said upper accordion blades back and forth between a retracted position and an accordion fold position; and at least one lower accordion fold device including a reciprocating lower fold blade which is adapted to move relative to said upper accordion blades to create said at least one accordion fold in said partially folded cushion.

5. An apparatus as set forth in claim 3, wherein said first folding apparatus comprises:

a base plate which is adapted to receive a central section of said main body portion of said cushion;

a movable center plate which is adapted to move from a retracted position to an engagement position where it engages said central section of said cushion such that said central section is clamped between said base plate and said movable center plate; and, a first fold table which is movable from a retracted position to a first fold position so as to create said first fold in said cushion.

6. An apparatus as set forth in claim 5, wherein said first folding apparatus further comprises a second fold table which is movable from a retracted position to a second fold position to create a second fold in said cushion which is generally parallel to said first fold.

7. An apparatus as set forth in claim 6, wherein said first folding apparatus further includes support structure for releasably supporting said first and second fold tables, said first and second fold tables being removable from said support structure to permit each of said first and second fold tables to be repositioned on said support structure on an opposite side of said base plate.

8. An apparatus for folding an inflatable cushion having a looped end portion and a main body portion and inserting the folded cushion into a cover comprising:

folding structure for creating folds in said main body portion to form a folded cushion, said folding structure including a mandrel adapted to extend through said looped end portion, first folding apparatus adapted to create a first fold in said main body portion to form a partially folded cushion, and accordion folding apparatus adapted to create a plurality of accordion folds in said partially folded cushion which are generally transverse to said first fold to form said folded cushion;

apparatus for supporting a cover into which said folded cushion is inserted; and said folding structure inserting said folded cushion into said cover.

9. An apparatus as set forth in claim 8, wherein said accordion folding apparatus comprises:

a main upper carriage which is movable back and forth between a folding position and an inserting position;

upper clamping and inserting apparatus including a base member, a first clamping member fixedly connected to said base member, a second clamping member, a first piston/cylinder unit coupled to said base member and said main upper carriage for effecting movement of said base member relative to said main upper carriage, and a second piston/cylinder unit coupled to said base member and said second clamping member for effecting movement of said second clamping member toward and away from said first clamping member;

an upper accordion fold device including a third piston/cylinder unit and upper accordion blades, said third piston/cylinder unit being coupled to said main carriage and said upper accordion blades for effecting movement of said upper accordion blades back and forth between a retracted position and an accordion fold position; and a plurality of lower accordion fold devices each including a respective reciprocating lower fold blade which is adapted to move relative to said upper accordion blades such that movement of said lower fold blades toward said upper accordion blades creates said plurality of accordion folds in said partially folded cushion.

10. An apparatus as set forth in claim 8 further including a mandrel clamping device which includes a clamping member adapted to clamp said looped end portion to said mandrel.

11. An apparatus as set forth in claim 8, wherein said first folding apparatus comprises:

a base plate which is adapted to receive a central section of said main body portion of said cushion;

a movable center plate which is adapted to move from a retracted position to an engagement position where it engages said central section of said cushion such that said central section is clamped between said base plate and said movable center plate; and, a first fold table which is movable from a retracted position to a first fold position so as to create said first fold in said cushion.

12. An apparatus as set forth in claim 11, wherein said first folding apparatus further comprises a second fold table which is movable from a retracted position to a second fold position to create a second fold in said cushion which is generally parallel to said first fold.

13. An apparatus as set forth in claim 12, wherein said first folding apparatus further includes support structure for releasably supporting said first and second fold tables, said first and second fold tables being removable from said support structure to permit each of said first and second fold tables to be repositioned on said support structure on an opposite side of said base plate.

14. A method for folding an inflatable cushion having an end portion and a main body portion and inserting the folded cushion into a cover comprising the steps of:

creating a first fold in said main body portion of said cushion to form a partially folded cushion;

creating a plurality of accordion folds in said partially folded cushion which are generally transverse to said first fold to form said folded cushion, wherein said step of creating a plurality of accordion folds comprises the steps of providing first and second upper clamping members, said second clamping member being movable relative to said first clamping member, providing a plurality of upper and lower accordion blades, moving said lower accordion blades toward said upper accordion blades to create said plurality of accordion folds in said folded cushion moving, one of said lower accordion blades to a retracted position, moving said second clamping member toward said first clamping member to a first clamping position after said one lower accordion blade has been moved to its retracted position, and relaxing said second clamping member after it has moved to said first clamping position;

supporting a cover into which said folded cushion is inserted; and inserting said folded cushion into said cover.

15. A method as set forth in claim 14, further comprising the steps of:

moving another of said lower accordion blades to a retracted position following said step of relaxing said second clamping member after it has moved to said first clamping position;

moving said second clamping member toward said first clamping member to a second clamping position after said another lower accordion blade has been moved to its retracted position; and relaxing said second clamping member after it has been moved to said second clamping position.

16. A method as set forth in claim 14, further comprising the step of creating a second fold in said body portion of said cushion prior to forming said plurality of accordion folds.

17. A method as set forth in claim 16, wherein said step of creating a first fold in said main body portion of said cushion to form a partially folded cushion comprises the steps of:

clamping a central section of said main body portion between a base plate and a movable center plate;

providing a first fold table;

moving said first fold table to a first fold position so as to create said first fold in said cushion.

18. A method as set forth in claim 17, wherein said step of creating a second fold in said main body portion of said cushion comprises the steps of:

providing a second fold table;

moving said second fold table to a second fold position so as to create said second fold in said cushion.

19. An apparatus for creating first and second folds in an inflatable cushion having an end portion and a main body portion comprising:

a base plate which is adapted to receive a central section of said main body portion of said cushion;

a movable center plate which is adapted to move from a retracted position to an engagement position where it engages said central section of said cushion such that said central section is clamped between said base plate and said movable center plate;

a first fold table which is movable from a retracted position to a first fold position so as to create a first fold in said cushion;

a second fold table which is movable from a retracted position to a second fold position to create a second fold in said cushion which is generally parallel to said first fold; and support structure for releasably supporting said first and second fold tables, said first and second fold tables being removable from said support structure to permit each of said first and second fold tables to be repositioned on said support structure on an opposite side of said base plate.

20. An apparatus as set forth in claim 19, wherein said support structure includes an adjustable bracket assembly which is located in a first position on a frame plate to limit the movement of said first fold table when a first inflatable cushion is being folded and is located in a second position on the frame plate which is different from said first position to limit the movement of said second fold table when a second inflatable cushion is being folded.

* * * * *